(12) United States Patent
Hakura et al.

(10) Patent No.: US 6,593,925 B1
(45) Date of Patent: Jul. 15, 2003

(54) PARAMETERIZED ANIMATION COMPRESSION METHODS AND ARRANGEMENTS

(75) Inventors: Ziyad S. Hakura, Menlo Park, CA (US); Jerome E. Lengyel, Seattle, WA (US); John M. Snyder, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 323 days.

(21) Appl. No.: 09/602,376

(22) Filed: Jun. 22, 2000

(51) Int. Cl.[7] ............................................... G06T 17/00
(52) U.S. Cl. ...................................................... 345/426
(58) Field of Search ................................. 345/418, 419, 345/420, 423, 424, 425, 427, 473

(56) References Cited

U.S. PATENT DOCUMENTS 6,429,872 B1 * 8/2002 Ernst .......................... 345/584
6,445,393 B1 * 9/2002 Fox et al. .................... 345/426
6,462,737 B2 * 10/2002 Lindholm et al. ........... 345/426
6,515,674 B1 * 2/2003 Gelb et al. ................... 345/582
6,518,968 B1 * 2/2003 Ritter et al. ................. 345/426

* cited by examiner

*Primary Examiner*—Cliff N. Vo
(74) *Attorney, Agent, or Firm*—Lee & Hayes, PLLC

(57) ABSTRACT

Methods and arrangements are provided for real-time rendering of scenes having various light sources and objects having differing specular surfaces. An offline encoder is employed to parameterize images by two or more arbitrary variables allowing view, lighting, and object changes. The parameterized images are encoded as a set of per-object parameterized textures based on shading models, camera parameters, and the scene's geometry. Texture maps are inferred from a ray-tracer's segmented imagery to provide the best match when applied to specific graphics hardware. The parameterized textures are encoded as a multidimensional Laplacian pyramid on fixed size blocks of parameter space. This technique captures the coherence in parameterized animations and decodes directly into texture maps that are easy to load into conventional graphics hardware.

85 Claims, 10 Drawing Sheets

| | |
|---|---|
| texture coordinate optimization | .93 sec |
| obtaining matrix A | 2.15 min |
| solving for textures | 2.68 min |
| storage allocation across pyramid levels | .5 min |
| storage allocation across objects | 1 sec |
| compression | .5 sec |
| total compilation | 5.4 min |
| ray tracing | 5 hours |

*Fig. 12*

| Encoding | Texture decimation | Worst fps | Average fps |
|---|---|---|---|
| Laplacian DCT | undecimated | 1.30 | 2.38 |
| | decimated | 3.51 | 8.77 |
| Laplacian SPIHT | undecimated | 0.18 | 0.39 |
| | decimated | 1.03 | 2.62 |

*Fig. 13*

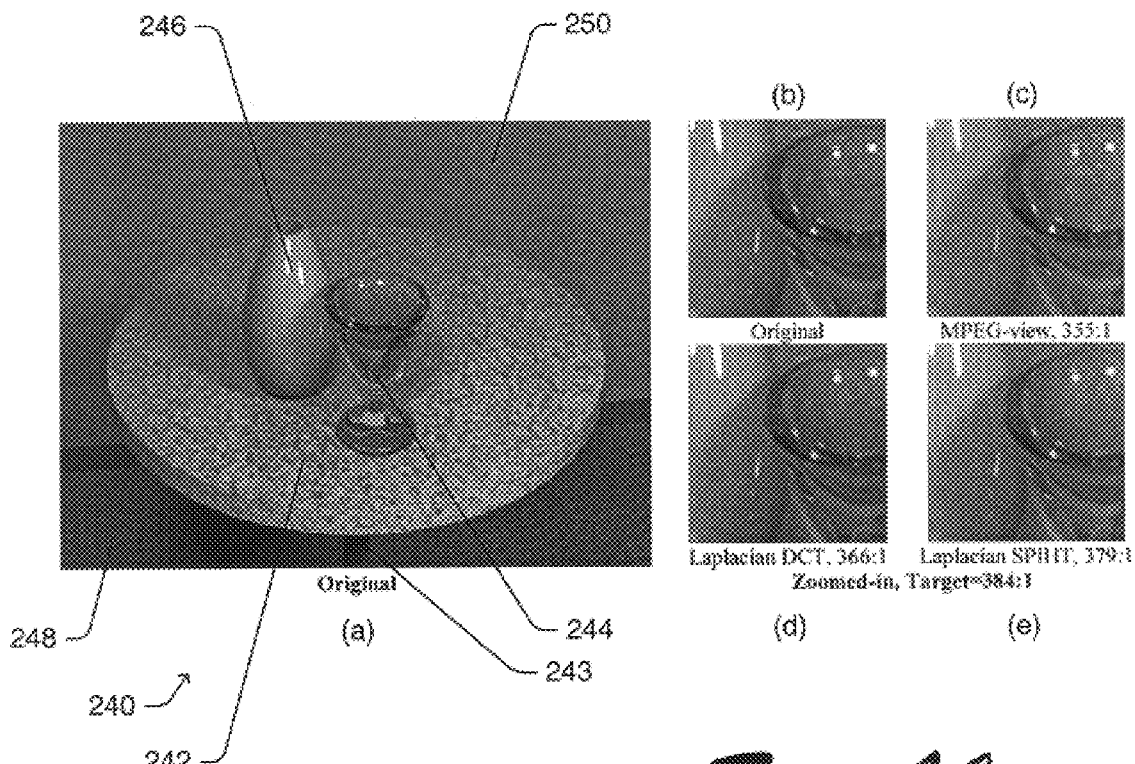

*Fig. 14*

PARAMETERIZED ANIMATION COMPRESSION METHODS AND ARRANGEMENTS

TECHNICAL FIELD

This invention relates to computers, and more particularly to improved methods and arrangements for use in generating, encoding, storing, transporting, accessing, and rendering images and animations using image-based rendering (IBR) data.

BACKGROUND

There is an on-going effort in computer graphics and image-based rendering to provide photorealistic image rendering of scenes. In particular, developers have been searching for methods and arrangements that can provide photorealistic, real-time rendering of dynamically changing scenes. Such scenes include, for example, interactive computer-generated animations, scene walkthroughs, etc.

Unfortunately, the requisite computation needed for such real-time renderings is substantially beyond the capability of most conventional personal computers and workstations, for all but the simplest of scenes.

Conventional personal computers (PCs), workstations, and the like usually have dedicated graphics hardware that is capable of rendering texture-mapped polygons in an efficient manner. In a move to provide more timely image rendering, several image based rendering techniques have been developed that take advantage of this texture mapping capability. By way of example, a view-dependent textures (VDT) method has been presented, in which geometric objects are texture mapped using projective mapping from view-based images.

This and other recent methods, however, usually fail to properly render highly specular surfaces, and often still require high levels of computation and data.

Thus, there is a continuing need for improved methods and arrangements that allow for real-time rendering of scenes having various light sources and objects having differing specular surfaces. Preferably, the methods and arrangements will use conventional graphics hardware configurations, support multidimensional animations, and reduce the amount of data required to render the scene.

SUMMARY

Methods and arrangements are provided for real-time rendering of scenes having various light sources and objects having different specular surfaces. The methods and arrangements take advantage of conventional graphics hardware to render texture-mapped polygons, but do so in a view-independent manner.

For example, the above stated needs and other are met by an arrangement that includes an offline encoder employed to parameterize images by two or more arbitrary variables allowing view, lighting, and object changes. The parameterized images can be encoded as a set of per-object parameterized textures based on shading models, viewpoint parameters, and the scene's geometry. Texture maps are inferred from the segmented imagery of an offline renderer (such as a ray-tracer) to provide the best match when applied to a specific graphics hardware/software rendering arrangement.

In certain implementations, the parameterized textures are encoded as a multidimensional Laplacian pyramid on fixed size blocks of parameter space. This technique captures the coherence associated with objects in the parameterized animations and decodes directly into texture maps that are easy to load into conventional graphics hardware. Certain implementations apply adaptive dimension splitting in the Laplacian pyramid to take advantage of differences in coherence across different parameter dimensions and separate diffuse and specular lighting layers to further improve the compression of the data. As a result of these various methods and arrangements, data compression ratios of greater than about 200:1 can be achieved. Indeed, for example, experiments have shown that data compression ratios as high as about 800:1 can be successfully achieved for real-time interactive play back of animated scenes using conventional graphics cards.

BRIEF DESCRIPTION OF THE DRAWINGS

A more complete understanding of the various methods and arrangements of the present invention may be had by reference to the following detailed description when taken in conjunction with the accompanying drawings wherein:

FIGS. 12 and 13 are tables depicting certain experimental results in accordance with certain implementations of the arrangement in FIG. 2 and the method in FIG. 3.

FIGS. 14, 15, 16, and 17 depict exemplary experimental results/images associated with certain aspects of the arrangement in FIG. 2 and the method in FIG. 3.

DETAILED DESCRIPTION

Exemplary Operating Environment

Figure 1:
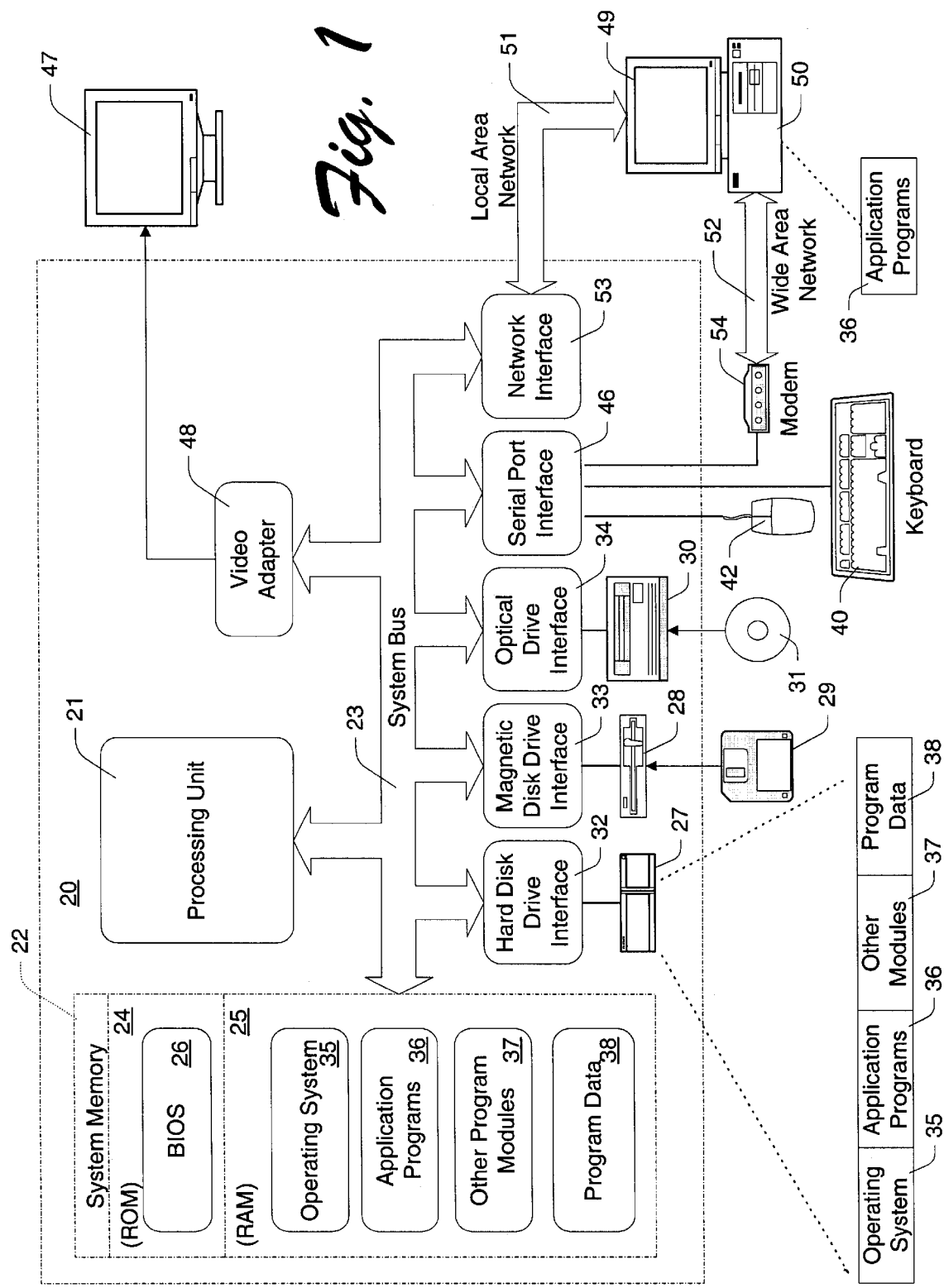
FIG. 1 is a block diagram depicting an exemplary computing environment suitable for use in generating, encoding, storing, transporting, accessing, and rendering image-based rendering (IBR) data associated with images and/or animations.

With reference to FIG. 1, an exemplary system for implementing the operations described herein includes a general-purpose computing device in the form of a conventional personal computer 20, including a processing unit 21, a system memory 22, and a system bus 23. System bus 23 links together various system components including system memory 22 and processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system 26 (BIOS), containing the basic routine that helps to transfer information between elements within the personal computer 20, such as during start-up, is stored in ROM 24.

As depicted, in this example personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM, DVD, or other like optical media. Hard disk drive 27, magnetic disk drive 28, and optical disk drive 30 are connected to the system bus 23 by a hard disk drive interface 32, a magnetic disk drive interface 33, and an optical drive interface 34, respectively. These exemplary drives and their associated computer-readable media provide nonvolatile storage of computer readable instructions, data structures, computer programs and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs), read only memories (ROMs), and the like, may also be used in the exemplary operating environment.

A number of computer programs may be stored on the hard disk, magnetic disk 29, optical disk 31, ROM 24 or RAM 25, including an operating system 35, one or more application programs 36, other programs 37, and program data 38. A user may enter commands and information into the personal computer 20 through input devices such as a keyboard 40 and pointing device 42 (such as a mouse).

Other input devices (not shown) may include a microphone, joystick, game pad, satellite dish, scanner, camera, or the like. These and other input devices are often connected to the processing unit 21 through a serial port interface 46 that is coupled to the system bus, but may be connected by other interfaces, such as a parallel port, game port, a universal serial bus (USB), etc.

A monitor 47 or other type of display device is also connected to the system bus 23 via an interface, such as a video adapter 48. In addition to the monitor, personal computers typically include other peripheral output devices (not shown), such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the personal computer 20.

The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, personal computer 20 is connected to local network 51 through a network interface or adapter 53. When used in a WAN networking environment, the personal computer 20 typically includes a modem 54 or other means for establishing communications over the wide area network 52, such as the Internet. Modem 54, which may be internal or external, is connected to system bus 23 via the serial port interface 46.

In a networked environment, computer programs depicted relative to personal computer 20, or portions thereof, may be stored in a remote memory storage device. It will be appreciated that the network connections shown are exemplary and other means of establishing a communications link between the computers may be used.

The exemplary operating environment having now been discussed, the remaining part of this description is directed towards describing various exemplary aspects and exemplary implementations of the present invention.

Introduction

As introduced in the Background section above, one of the critical needs in computer-based image rendering is the need for a real-time rendering capability suitable for rendering physically illuminated, dynamic environments, and other like scenes/objects.

The computation needed to provide such a capability using conventional techniques is far beyond the current capability of most graphics rendering arrangements, and in particular the graphics hardware arrangements currently available for personal computers, workstations, and the like.

These conventional graphics hardware arrangements usually render texture-mapped polygons. Fortunately, these specialized graphics hardware arrangements are becoming more powerful while also becoming more affordable. Indeed, certain implementations of the present invention are advantageously adapted for use with these types of hardware arrangements in decompressing animations that have been previously computed and compiled offline.

As described below, not only are the various exemplary methods and arrangements suitable for use with conventional graphics hardware, but they also provide renderable imagery that can exhibit a full gamut of stochastic ray-tracing effects, including, for example, indirect lighting with reflections, refractions, shadows, and the like. Moreover, for selected scenes, such as synthetically generated scenes, time and viewpoint parameters of the well-known plenoptic function can be generalized.

As such, the various exemplary methods and arrangements presented herein are free to parameterize the radiance field, for example, based on time, position of lights or viewpoint, surface reflectance properties, object positions, or any other degrees of freedom in the scene, resulting in an arbitrary-dimensional parameterized animation.

In accordance with certain further aspects of the present invention, the amount of compression of the parameterized animation is substantially maximized while still maintaining satisfactory quality and being decodable in real-time.

Thus, for example, as described in the examples below, once the encoded image data is downloaded over a network, for example, or otherwise provided to the graphics hardware arrangement, the decoder therein may take advantage of specialized hardware and high bandwidth to allow a user to visually explore the parameter space. Here, the significantly high compression ratios advantageously reduce the requisite downloading time, conserves server and client storage space, etc.

In accordance with certain aspects of the present invention, the various methods and arrangements infer and compress parameter-dependent texture maps for individual objects rather than combined views of the entire scene. As applied herein, to infer a texture map generally means to find one that, when applied to a hardware-rendered geometric object, substantially matches the offline-rendered image.

By encoding a separate texture map for each object, the various methods and arrangements are able to better capture the object's coherence across the parameter space independent of where, within the overall image, the object appears. In this manner, for example, object silhouettes may be correctly rendered from actual geometry while suffering fewer compression artifacts. Additionally, it has been found that the rendered viewpoint may also move from original parameter samples without necessarily revealing any significant geometric disocclusions.

Figure 2:
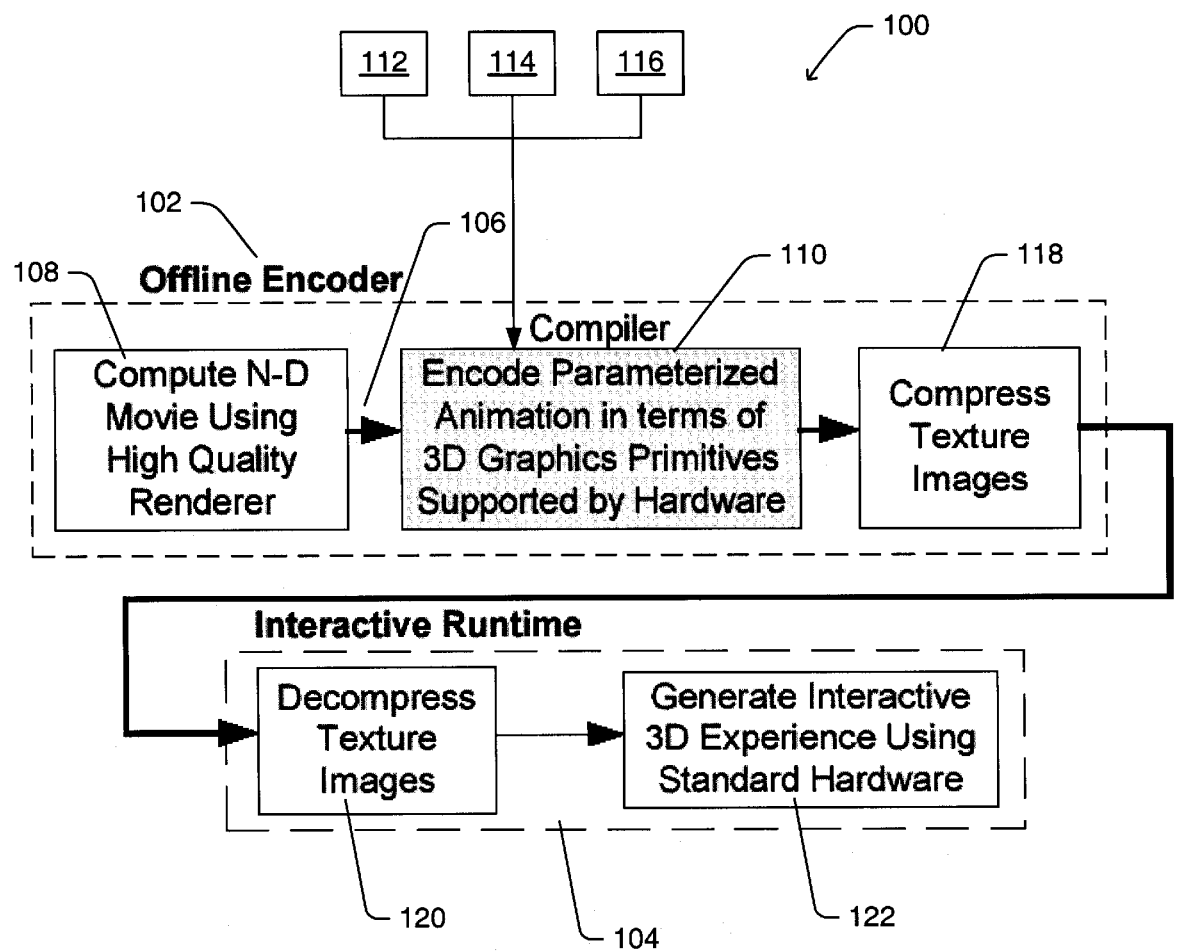
FIG. 2 is a block diagram depicting an exemplary arrangement for processing of image data, transporting image data and subsequently rendering image data, in accordance with certain aspects of the present invention.

With this introduction in mind, attention is now drawn to an exemplary arrangement 100 in FIG. 2. Arrangement 100 includes an offline encoder 102 that is operatively coupled to an interactive runtime decoder 104.

Offline encoder 102 is configured to generate or otherwise receive ray-traced images 106 at each point in the parameter space, for example, associated with an N-dimensional (N-D) movie sequence output by a high quality renderer 108. Ray-traced images 106 are fed to a compiler 110 along with related scene geometry information 112, lighting model information 114, and viewing parameter information 116.

In accordance with certain aspects of the present invention, compiler 110 can be configured to target a specific type of graphics hardware and/or software suite within interactive runtime decoder 104. Compiler 110 is preferably configured to infer texture resolution, texture domain mapping, and texture samples for each object over the parameter space thereby resulting in an image that closely matches the "gold-standard" or original images. The resulting per-object texture maps are then compressed, for example, using a multi-dimensional compression scheme implemented in compression engine 118.

As further depicted in the example in FIG. 2, interactive runtime decoder 104 includes a texture decompression engine 120 and a rendering engine 122. In certain preferred implementations, texture decompression engine 120 and rendering engine 122 are operated simultaneously. In certain implementations, rendering engine 122 includes a conventional hardware-accelerated rendering capability.

Thus, as functionally depicted in the example of FIG. 2, offline encoder 102 computes an N-D movie using a high-quality renderer, encodes parameterized animation in terms of 3D graphics primitives that are supported by hardware, and then compresses the resulting texture images. Subsequently, interactive runtime decoder 104 decompresses the texture images and generates a corresponding interactive 3D graphical viewing experience using standard graphics rendering hardware arrangements.

In accordance with certain aspects of the present invention, the problem of compressing multidimensional animations, not just radiance fields parameterized by viewpoint or animations through 1D time, is presented. Certain implementations are able to fully exploit relatively inexpensive and ubiquitous graphics hardware arrangements by rendering texture maps on geometric objects rather than view-based images. Moreover, an automated process is provided to allocate storage over objects' texture maps and select texture map resolutions and domains based on the gold-standard images. Additionally, as described in greater detail below, separate diffuse and/or specular lighting layers can be used to further increase the compression ratio, for example, by implementing automatic storage allocation over these lighting layers.

Other aspects of the present invention include a novel strategy for texture inference from segmented images that may be optimized for decoding on specific graphics hardware/software arrangements. By way of example, certain optimization approaches introduce a pyramidal regularization term that ensures an entire texture is defined, with occluded regions being filled significantly smooth.

Other aspects of the present invention include novel methods and arrangements for general, multidimensional compression using an adaptive Laplacian pyramid that allows real-time decoding and high compression ratios. For example, in certain exemplary implementations, a novel run-time arrangement is provided that caches to speed texture decoding and staggers block origins to distribute decompression load.

In accordance with further aspects of the present invention, examples are presented below for encoding, transporting, decoding, and rendering realistic, highly specular objects within scenes containing multiple objects, each having hundreds or thousands of polygons. All of this can be accomplished, for example, using a conventional PC equipped with a consumer-grade graphics card.

The quality and generality in images produced using the exemplary methods and arrangements taught herein clearly exceed previous work in image-based rendering. Thus, for example, certain implementations to the present invention have been compared to other encoding schemes, such as MPEG4. These early test results tend to show that high-quality images are possible at compression ratios of between about 200:1 and about 800:1 with near real-time (e.g., about 2.4 Hz) decoders capable of hardware implementation. Faster decoding (e.g., at least 9 Hz) is also possible at reduced quality.

Since a computer system's main bottleneck is usually texture decompression, the findings herein provide incentive for incorporating more sophisticated texture decompression functionality in future graphics pipelines.

Before describing the exemplary methods and arrangements in greater detail, there are a number of initial assumptions to discuss.

Firstly, it is assumed that a list of the geometric objects and their texture parameterizations are given as input to offline encoder 102.

Secondly, efficient encoding relies on parameter-independent geometry; that is, geometry that remains static or rigidly moving and thus represents a small fraction of the storage compared to the parameter-dependent textures. With this in mind, for each object, polygonal meshes with texture coordinates are preferably encoded once, for example, as header information.

Thirdly, compiler 110 requires access to an image at each point in parameter space. Thus, the attendant compilation is exponential in dimension. It is believed that such a compilation approach is adequate for spaces in which all but one or two dimensions are essentially "secondary"; i.e., having relatively few samples. Examples include viewpoint movement along a 1D trajectory with limited side-to-side movement, viewpoint changes with limited, periodic motion of some scene components, time or viewpoint changes coupled with limited changes to the lighting environment, and the like. Note, however, that these various assumptions are particularly tied to the computational capabilities currently available to consumers. As the computational capabilities increase in the future, one or more of these assumptions may not apply.

Image-Based Rendering (IBR) has sought increasingly accurate approximations of the well-known plenoptic function, or spherical radiance field parameterized by 3D position, time, and wavelength. Various approximation techniques have been put to good use, especially in computer graphics that use a pixel flow to interpolate views. The plenoptic function has also been advantageously reduced to a 4D field, for example, thereby allowing view interpolation with view-dependent lighting. Layered depth images (LDI) are another well-known representation of the radiance field better able to handle disocclusions without unduly increasing the number of viewpoint samples. This idea has also been extended to a 5D field that permits changes to the lighting environment.

One of the remaining challenges to such methods is the efficient storage of the resulting high-dimensional image fields. For spatially coherent scenes, for example, it has been observed that geometry-based surface fields better able to capture coherence in the light field and, as such, typically achieve a more efficient encoding than view-based images like the LDI or well-known Lumigraph/Light field.

In other related work, a surface light field has been used to encode reflected rays in glossy walkthroughs, by pre-computing a discrete sampling of the glossy reflection, and using LDI to encode the reflected objects.

As described below, we have chosen to generalize parameterizations based solely on viewpoint. Consequently, one can automatically allocate texture storage per object. One may also provide methods and arrangements that encode an entire texture at each point in parameter space that can be selectively accessed, for example, in constant time, independent of the size of the whole representation.

Another conventional IBR hybrid includes view-dependent textures) (as mentioned in the Background section), in which geometric objects are texture-mapped using a projective mapping from view-based images. VPT methods depend on viewpoint movement for proper antialiasing, i.e., novel views are generated by reconstructing the scene using nearby views that face each surface sufficiently "head-on". Unfortunately, such reconstruction is often incorrect, especially for highly specular surfaces, to the methods and arrangements described herein avoid such problems by inferring texture maps that produce antialiased reconstructions independently at each parameter location, even for spaces with no viewpoint dimensions. This can be accomplished, for example, by generating per-object segmented images in the ray tracer and inferring textures that match each segmented layer.

In addition to a generalized parameterization, our approach also uses "intrinsic" texture parameterizations (i.e., viewpoint-independent (u,v) coordinates per vertex on each mesh) rather than view-based ones. As such, the methods and arrangement are able to capture the view-independent lighting in a single texture map rather than a collection of views to obtain significantly higher compression ratio. Furthermore, disocclusions are handled without deciding which polygons are visible in which views or gathering polygons corresponding to different views in separate passes.

To infer information corresponding to occluded regions of an object, for example, certain implementations include a pyramidal regularization term in the texture inference to provide smooth "hole-filling" without a specialized post-processing pass.

Another conventional approach to interactive photorealism seeks to improve hardware shading models rather than fully tabulating incident or emitted radiance. For example, shadow volumes and recursive hardware rendering have been used to compute approximations to global rendering. This has also been extended to curved reflectors, and further improved for soft shadows and indirect illumination by adding a separate compositing pass for specular reflections. Others have used image-based radiance distributions encoded in reflection maps for more photorealistic lighting. Certain conventional methods include computing two texture maps to approximate a BRDF with hardware rendering. Others have decided to encode anisotropic lighting and specular reflections with Fresnel effects using hardware texturing.

Unfortunately, even with the use of several parallel graphics pipelines, these various approaches are only able to handle simple scenes, and, because of limitations on the number of passes, do not capture all the effects of a full offline photorealistic rendering, including, for example, multiple bounce reflections, refractions and/or accurate shadows.

It has been shown that the recovery of texture maps from the gold-standard images is closely related to surface reflectance estimation in computer vision. For example, certain conventional techniques recover diffuse albedo maps and a spatially invariant characterization of specularity in the presence of unknown, indirect lighting. Such techniques, however, are typically very complicated. The methods and arrangements disclosed herein tend to be much simpler and solve the problem by using known geometry and separating diffuse and specular lighting layers during an offline rendering stage. Here, focus is instead placed on the problem of inferring textures for a particular graphics hardware target that "undo" its undesirable properties, like poor-quality texture filtering, for example.

With regard to data compression, various conventional strategies for compressing a dual-plane Lumigraph parameterization have been proposed. By way of example, vector quantization and entropy coding have been used to produce compression ratios of up to about 118:1. Similarly, certain wavelet-based techniques and block-based discrete cosine transform (DCT) encoder have produced compression ratios of about 20:1. Others have suggested used an eigenbasis (K-L transform) to encode surface textures achieving compression ratios of about 20:1 with eigenbasis having 8–18 texture vectors. Such a representation typically requires an excessive number of "eigentextures" to faithfully encode highly specular objects. This usually prohibits real-time decoding, which involves computing a linear combination of the eigentextures.

The exemplary methods and arrangements described herein employ a Laplacian pyramid on blocks of the parameter space. This tends to speed-up run-time decoding (e.g., for 8×8 blocks of a 2D parameter space, only 4 images should be decompressed and added to decode a texture) and achieves good quality at compression ratios as high as about 800:1.

Other work on texture compression in computer graphics includes the use of vector quantization on 2D textures providing compression ratios of up to about 35:1.

Another relevant area of work is animation compression. Standard video compression uses simple block-based transforms and image-based motion prediction. It has been observed that the compression ratio can be increased by is exploiting information available in synthetic animations. In effect, the animation script essentially provides perfect motion prediction. It has also been shown that simple graphics hardware may be used to match a synthetic image stream produced by a simultaneously executing, high-quality server renderer by exploiting polygon rendering and transmitting a residual signal to the client. Others have used view-dependent texture maps to progressively transmit diffusely shaded, texture-intensive walkthroughs, finding factors of roughly 10 improvement over MPEG for scenes of simple geometric complexity. The various methods and arrangements described herein improve such techniques by using texture-mapping graphics hardware to match multidimensional animations containing non-diffuse, offline-rendered imagery.

Figure 3:
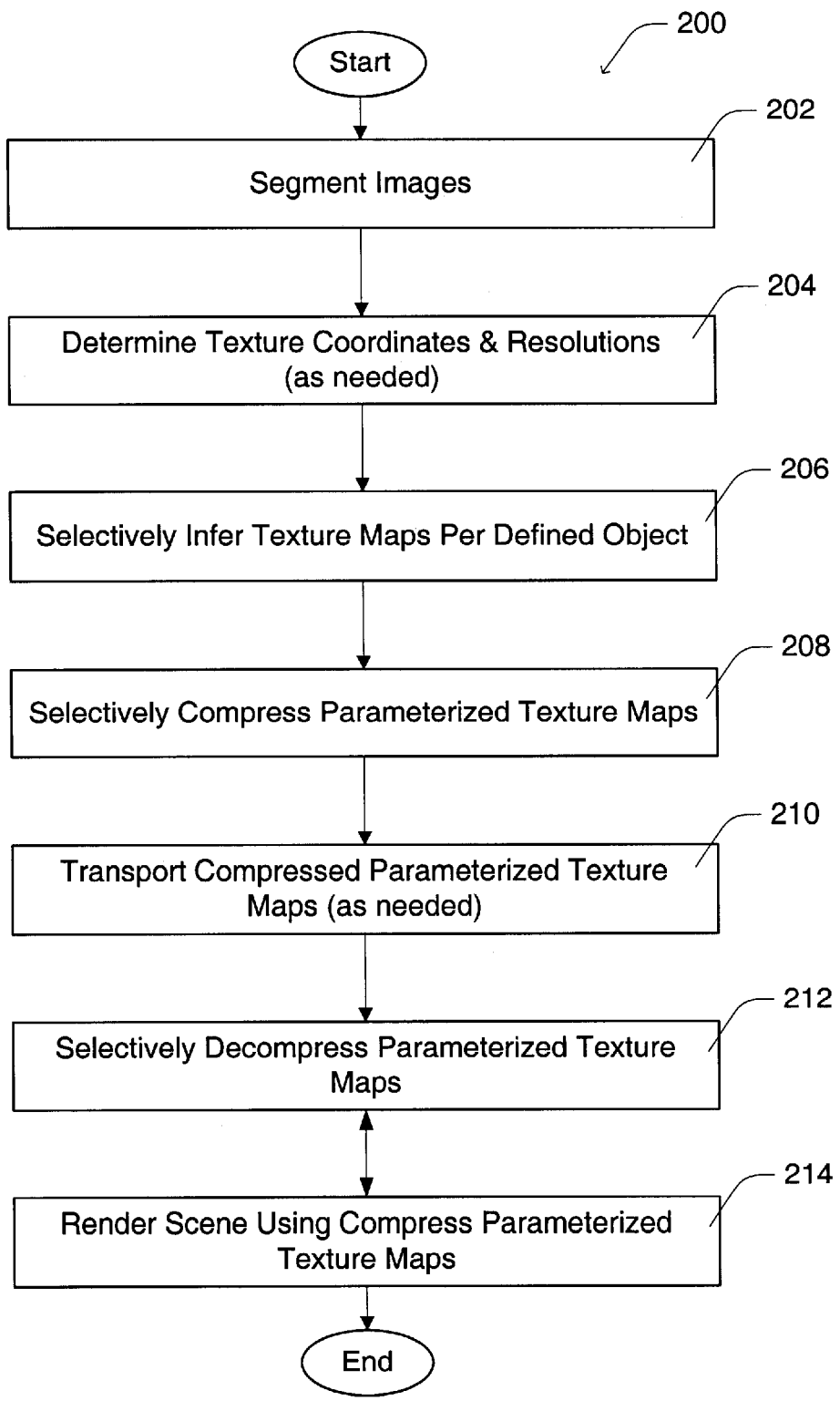
FIG. 3 is a flow chart depicting an exemplary method for use in processing of image data, transporting image data and subsequently rendering image data, in accordance with certain aspects of the present invention.

A high-level flow-chart of a process 200 associated with certain exemplary implementations of the present invention is shown in FIG. 3. The steps in process 200 are described in greater detail in subsequent sections with reference to certain exemplary methods and arrangements.

As depicted, process 200 includes step 202, in which a gold standard image or like image that is rendered, for example, with a ray-traced render, is segmented into a plurality of pieces associated with one or more defined objects within a scene. In step 204, preferred texture coordinates and/or resolutions are determined, as needed to provide a best matching capability to a specific targeted graphics rendering hardware/software configuration. Next, in step 206, texture maps are selectively inferred for each defined object. In step 208, the resulting parameterized texture maps are selectively compressed. The compressed parameterized texture maps are then transported, as needed, in step 210. In step 212, the compressed parameterized texture maps are selectively decompressed for rendering of the scene in step 214. Note that steps 212 and 214 may be conducted simultaneously, as mentioned above with respect to interactive runtime decoder 104 in FIG. 2.

Parameterized Texture Inference

In certain preferred implementations, one may infer texture maps using an optimization approach that models how the graphics hardware projects them to the screen. This can be accomplished experimentally by directly querying the target hardware using a series of test renderings of the actual geometry on that hardware. The inferred texture maps can then be encoded. To achieve reasonable encoding, it is important to determine an appropriate texture resolution and avoid encoding parts of the texture domain that are not visible.

Segmenting Ray-Traced Images

Each geometric object has a parameterized texture that should be inferred from the ray-traced images. These images are first segmented into per-object pieces to prevent bleeding of information from different objects across silhouettes. Bleeding tends to decrease coherence and may lead to misplaced silhouettes when the viewpoint moves away from the original samples.

To perform per-object segmentation, the ray tracer is configured to generate a per-object mask as well as a combined image, all at supersampled resolution. For each object, one can then filter the relevant portion of the combined image as indicated by the mask and divide by the fractional coverage computed by applying the same filter to the object's mask. A gaussian filter kernel can be used to avoid problems with negative coverages.

A second form of segmentation separates the view-dependent specular information from the view-independent diffuse information, in the common case that the parameter space includes at least one view dimension. This reduces the dimensionality of the parameter space for the diffuse layer, improving compression. As the image is rendered, the ray-tracer places information from the first diffuse intersection in a view-independent layer and all other information in a view-dependent one.

Figure 4:
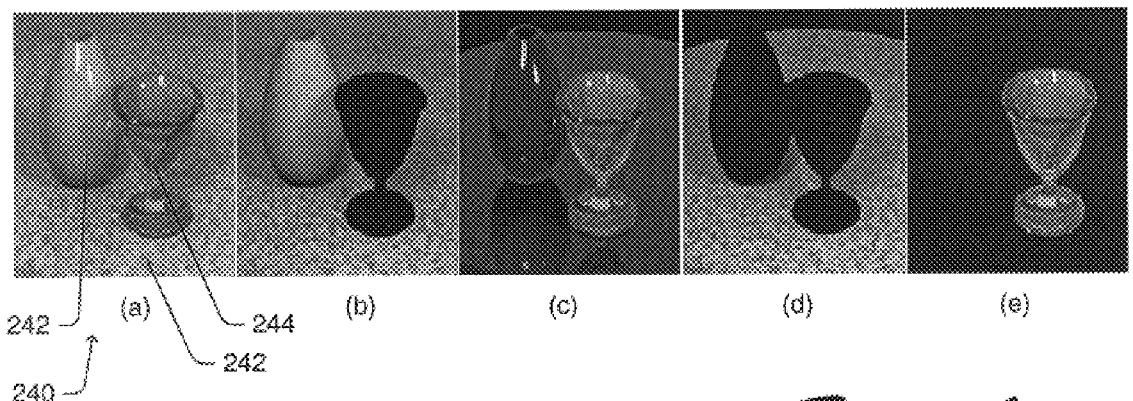
FIGS. 4 and 5 depict exemplary images associated with certain aspects of the arrangement in FIG. 2 and the method in FIG. 3.

FIG. 4 illustrates segmentation for a portion of an exemplary ray-traced image 240 having a table 242 on which sits a parfait glass 244 and a flower vase 246. The ray tracer that was used was a modified version of Eon, which is a Monte Carlo distribution ray-tracer. This and similar ray tracing mechanisms are well known and can be found, for example, in references by: Cook, R. L., T. Porter, and L. Carpenter, "Distributed Ray Tracing," SIGGRAPH 84; Shirley, and Wang, "Distribution Ray Tracing: Theory and Practice," Proceedings of the 3rd Eurographics Rendering Workshop, Bristol, 1992; and, Shirley, Wang and Zimmerman, "Monte Carlo Methods for Direct Lighting Calculations," ACM Transactions on Graphics, January 1996. Each of the preceding references is incorporated herein, and for all purposes.

FIG. 4(a) shows the complete ray traced image. FIG. 4(b) shows the corresponding diffuse layer. FIG. 4(c) shows the corresponding specular layer. FIG. 4(d) shows the diffuse table layer portion. FIG. 4(e) shows the specular parfait glass layer

Least-Squares Method

A least-squares method will now be described for inferring texture maps. Marschner, S. R., Inverse Rendering for Computer Graphics, Ph.D. Thesis, Cornell University, August 1998, 7–16A provides a simple algorithm for inferring an object's texture map from its segmented image maps each texel location to the image and then filters the neighboring region to reconstruct the texel's value. One problem with this approach is reconstruction of texels near arbitrarily shaped object boundaries and occluded regions as in FIGS. 4(d,e). It is also difficult to infer MIPMAPs when there are occluded regions whose corresponding regions in the texture image are undefined. Finally, the simple algorithm does not take into account how texture filtering is performed on the target graphics hardware.

A more principled approach is to model the hardware texture mapping operation in the form of a linear system:

$$\underbrace{\begin{bmatrix} \text{filter coefficients for } S_{0,0} \\ \text{filter coefficients for } S_{0,1} \\ \vdots \\ \\ \\ \\ \\ \\ \\ \\ \text{coefficients for } S_{m-1,n-1} \end{bmatrix}}_{A} \underbrace{\begin{bmatrix} \left.\begin{matrix} x^0_{0,0} \\ \vdots \\ x^0_{u-1,v-1} \end{matrix}\right\} level_0 \\ \left.\begin{matrix} x^1_{0,0} \\ \vdots \\ x^1_{\frac{u}{2}-1,\frac{v}{2}-1} \end{matrix}\right\} level_1 \\ \vdots \\ \left.\begin{matrix} x^{l-1}_{0,0} \\ \vdots \\ x^1_{\frac{u}{2^{l-1}}-1,\frac{v}{2^{l-1}}-1} \end{matrix}\right\} level_{l-1} \end{bmatrix}}_{x} = \underbrace{\begin{bmatrix} S_{0,0} \\ S_{0,1} \\ \vdots \\ \\ \\ \\ \\ \\ \\ \\ S_{m-1,n-1} \end{bmatrix}}_{b} \quad (1)$$

where vector b contains the ray-traced image to be matched, matrix A contains the filter coefficients applied to individual texels by the hardware, and vector x represents the texels from all 1—1 levels of the MIPMAP to be inferred. Superscripts in x entries represent MIPMAP level and subscripts represent spatial location.

Note that this model ignores hardware nonlinearities in the form of rounding and quantization. While Equation 1 expresses the problem for just one color component, the matrix A is common across all color components. Each row in matrix A corresponds to a particular screen pixel, while each column corresponds to a particular texel in the texture's MIPMAP pyramid. The entries in a given row of A represent the hardware filter coefficients that blend texels to produce the color at a given screen pixel.

Since hardware filtering usually only requires a relatively small number of texel accesses per screen pixel, matrix A is usually very sparse. A hardware z-buffer algorithm can be used to determine object visibility on the screen, and need only consider rows (screen pixels) where the object is visible. Other rows can be logically filled with zeroes but are actually deleted from the matrix, by using a table of visible pixel locations.

While filter coefficients should sum to one in any row, in practice row sums of inferred coefficients are often less than one due to truncation errors. A simple correction is to add an appropriate constant to all nonzero entries in the row. A more accurate method recognizes that each coefficient represents the slope of a straight line in a plot of screen pixel versus texel intensity. Thus, one can therefore test a variety of values and return the least squares line.

Figure 5:
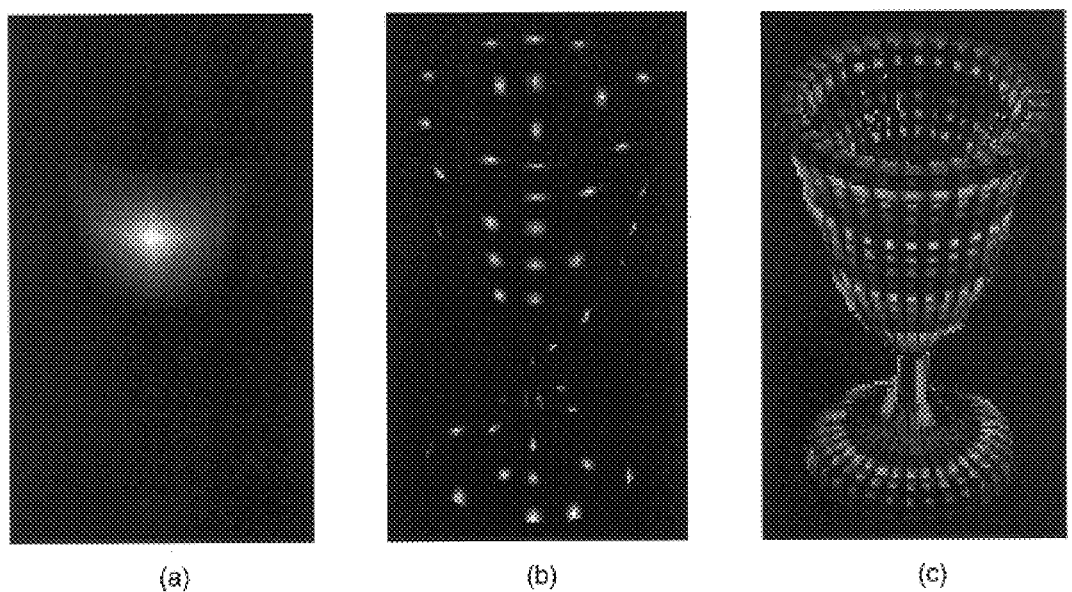

With this in mind, the next step is to obtain matrix A in Equation (1), above. For reference purposes, FIG. 5(a) depicts a screen image 250 of parfait glass 244 with single texel in an 8×8 texture that is set to a full intensity value; FIG. 5(b) similarly depicts a screen image 252 of parfait glass 244 when multiple texels in a 64×64 texture image are set to full intensity values, such that alternate 8×8 blocks do not overlap; and, FIG. 5(c) similarly depicts a screen image 254 of parfait glass 244 with 256×256 texture where two color components are used for encoding texel identifiers.

Obtaining Matrix A

A simple but impractical algorithm for obtaining matrix A examines the screen output from a series of renderings, each setting only a single texel of interest to a nonzero value (as in FIG.5(a)), as follows:
Initialize the z-buffer with visibility information by rendering the entire scene.
For each texel in the MIPMAP pyramid,
  Clear the texture, and set the individual texel to a maximum intensity, and
  Clear the frame buffer, and render all triangles that compose an object; and
  For each non-zero pixel in the frame buffer,
    Divide the screen pixel value by the maximum frame buffer intensity, and
    Place the resulting fractional value in matrix A [screen pixel row] [texel column].

The accuracy of inferred filter coefficients is limited by the color component resolution of the frame buffer, which is typically 8 bits. To accelerate the simple algorithm, it was observed that multiple columns in the matrix A can be filled in parallel as long as texel projections do not overlap on the screen and one can determine which pixels derive from which texels (as in FIG. 5(b)). An algorithm that subdivides texture space and checks that alternate texture block projections do not overlap can be devised based on this observation.

An even better algorithm, however, recognizes that since just a single color component is required to infer the matrix coefficients, the other color components (typically 16 or 24 bits) can be used to store a unique texel identifier that indicates the destination column for storing the filtering coefficient (as in FIG. 5(c)).

For trilinear MIPMAP filtering, a given screen pixel accesses four texels in one MIPMAP level, as well as four texels either one level above or below having the same texture coordinates. To avoid corrupting the identifier, one should store the same texel identifier in the possible filtering neighborhood of a texel, as shown in FIG. 6.

By leaving sufficient spacing between texels computed in parallel, matrix A can be inferred in a fixed number of renderings, P, where P=6×6×3=108. This number is obtained by solving in parallel every sixth sample in both dimensions of the same MIPMAP level, and every third MIPMAP level, thus ensuring that possible filtering neighborhoods of samples solved in parallel do not interfere. For hardware with the power of two constraint on texture resolution, there is an additional technical difficulty when the texture map has one or two periodic (wrapping) dimensions. In that case, since 6 does not evenly divide any power of 2, the last group of samples may wrap around to interfere with the first group. One solution simply solves in parallel only every eighth sample.

By inferring matrix A in the manner described above it is assumed that the "extra" color components contain at least $\log_2$ (n/P) bits where n is the number of texels.

Figure 6:
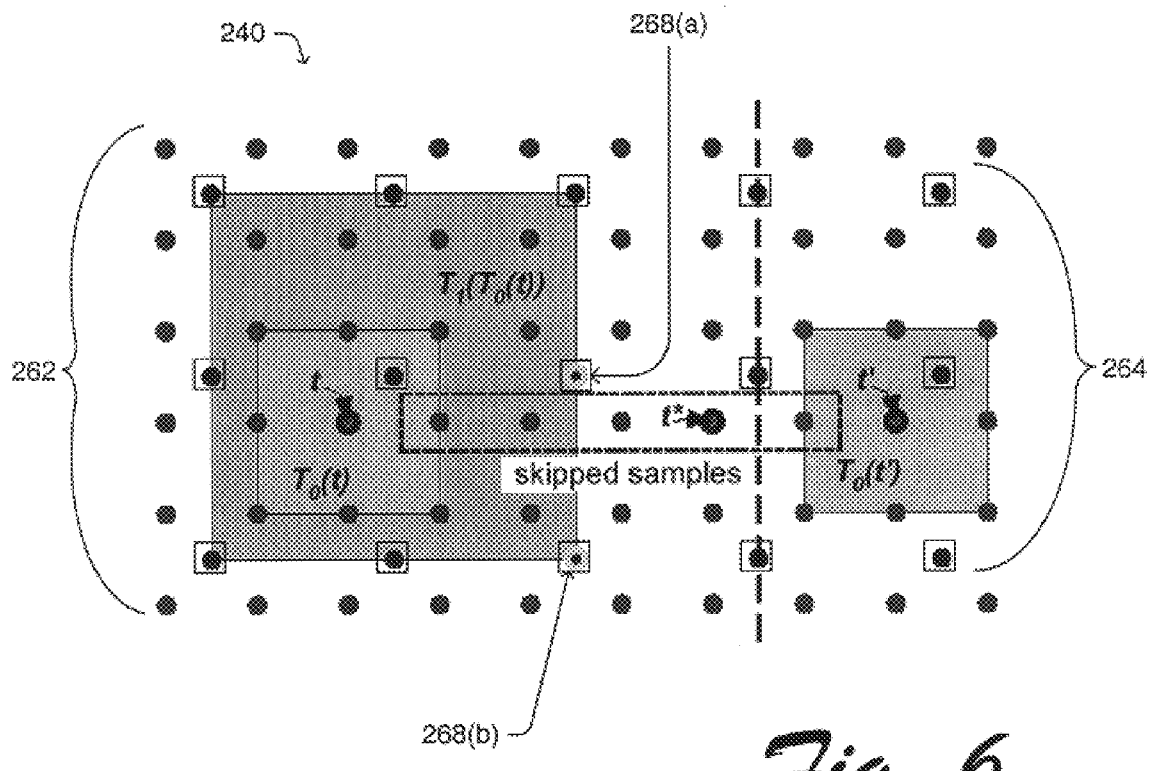
FIG. 6 is an illustrative representation of a trilinear filtering process in accordance with certain implementations of the arrangement in FIG. 2 and the method in FIG. 3.

FIG. 6 graphically depicts an exemplary trilinear filtering technique for use in parallel matrix inference. Here, sample 260 includes a first set of dots 262 that represent texel samples, and a second set of dots 264 (depicted in small squares) that represent samples in the next higher level of the MIPMAP.

To infer the filter coefficients at a sample t 266, one should ensure that all samples that could possibly be filtered with it to produce a screen pixel output have identical texel identifiers. The region $T_0(t)$ represents the region of texture space in the same MIPMAP level that could possibly access sample t 266 with bilinear filtering, referred to as its level 0 neighborhood. This region $T_0(t)$ can possibly access samples from the next higher level of the MIPMAP depicted by the second set of dots 264 (depicted in small squares) within region $T_1(T_0(t))$, which is referred to as the level 1 neighborhood of sample t's level 0 neighborhood.

One should not solve in parallel a texel that shares any of these samples in its filtering neighborhood so only texels whose level 0 neighborhood are completely to the right of the dashed line are candidates. For example, the sample labeled t* cannot be solved in parallel with t since the applicable t* level 1 neighborhood shares two samples 268(a–b) with t, shown outlined in yellow. Even the sample to its right should be skipped since its level 0 neighborhood still includes shared samples at the next higher MIPMAP level.

Sample t' is the closest sample to sample t 266 that can be solved in parallel. Thus, as shown in each dimension, at least five samples should be skipped between texels that are solved in parallel.

Inference With Antialiasing

To antialias images, supersampling and filtering can be performed in the graphics hardware. Unfortunately, this decreases the precision with which one can infer the matrix A coefficients, since the final result is still an 8-bit quantity in the frame buffer. Thus, higher precision can be obtained by inferring based on the supersampled resolution (i.e., without antialiasing), and filtering matrix A using a higher-precision software model of the hardware's antialiasing filter. Sub-pixels (rows in the supersampled matrix) that are not covered by the object should not contribute to the solution.

As in the segmentation technique described above, one may filter the matrix A and then divide by the fractional coverage at each pixel as determined by the hardware rendering. Small errors can arise, however, because of minor differences in pixel coverage between the ray-traced and hardware-generated images.

Solution Method

Matrix A is an $n_s \times n_t$ matrix, where $n_s$ is the number of screen pixels in which the object is visible, and $n_t$ is the number of texels in the object's texture MIPMAP pyramid. Once matrix A is obtained, one can solve for the texture represented by the vector x by minimizing a function f(x) defined as:

$$f(x) = \|Ax-b\|^2 \nabla f(x) = 2A^T(Ax-b) \quad (2)$$

which is subject to the constraint $0 \leq x_{i,j}^k \leq 1$. Availability of the gradient, $\nabla f(x)$, allows use of the conjugate gradient method to significantly minimize f(x). Since f(x) and $\nabla f(x)$ are most often evaluated in pairs, one can factor out the computation of Ax-b. The main computation of the solution's inner loop multiplies A or $A^T$ with a vector representing the current solution estimate. Since A is a sparse matrix with each row containing a small number of nonzero elements (e.g., exactly 8 with trilinear filtering), the cost of multiplying A with a vector is proportional to $n_s$.

Another way to express the same f(x) and $\nabla f(x)$ is as follows:

$$f(x) = xA^TAx - 2x \cdot A^Tb - b \cdot b \nabla f(x) = 2A^TAx - 2A^Tb \quad (3)$$

Again, since f(x) and $\nabla f(x)$ are often evaluated simultaneously, one can factor out the computation of $A^TAx$, and precompute the constants $A^TA$, $A^Tb$, and $b \cdot b$. In this formulation, the inner loop's main computation multiplies $A^TA$, an $n_t \times n_t$ matrix, with a vector. Since $A^TA$ is also sparse, though likely less so than A, the cost of multiplying $A^TA$ with a vector is proportional to $n_t$.

In certain exemplary implementations, the following heuristic was used to decide which set of equations (i.e., set (2) or set (3)) to use:

If $(2n_s \geq Kn_t)$ Use $A^TA$ method: Equation set (3)
else
  Use A method: Equation set (2)
where K is a measure of relative sparsity of $A^TA$ compared to A. In certain implementations, K=4 was used. The factor 2 in the test arises because Equation set (2) requires two matrix-vector multiplies while Equation set (3) only requires one. Those skilled in the art will recognize that the solver can be sped up by using an initial guess vector x that interpolates the solution obtained at lower resolution. The problem size can then be gradually scaled up until it reaches the desired texture resolution.

This multiple resolution solver idea can also be extended to the other dimensions of the parameter space. Alternatively, once a solution is found at one point in the parameter space, it can be used as an initial guess for neighboring points, which are immediately solved at the desired texture resolution. Our experiments tend to show that the second method is somewhat more efficient.

Segmenting the ray-traced images into view-dependent and view-independent layers allows us to collapse the view-independent textures across multiple viewpoints. To compute a single diffuse texture, the following problem can be solved:

$$\underbrace{\begin{bmatrix} A_{v_0} \\ A_{v_1} \\ \vdots \\ A_{v_{n-1}} \end{bmatrix}}_{A'} \underbrace{[x]}_{x} = \underbrace{\begin{bmatrix} b_{v_0} \\ b_{v_1} \\ \vdots \\ b_{v_{n-1}} \end{bmatrix}}_{b'} \quad (4)$$

where matrix A' concatenates the A matrices for the individual viewpoints $v_0$ through $v_{n-1}$, vector b' concatenates the ray-traced images at the corresponding viewpoints, and vector x represents the diffuse texture to be solved. Since the number of rows in A' tends to be much larger than the number of columns, the $A^TA$ method described above in Equation set (3) can be used. In addition to speeding up the solver, this method also reduces memory requirements.

Regularization

Samples in the texture solution should lie in the interval [0,1]. To ensure this, a regularizing term can be added to the objective function f(x). The term, referred to as range regularization, is defined as follows:ε

$$g(x_{ij}^k) = \frac{1}{(x_{ij}^k + \delta)(1 + \delta - x_{ij}^k)} \quad (5)$$

$$f_{reg-01}(x) = f(x) + E_b \left(\frac{n_s}{n_t}\right) \overbrace{\left(\frac{1}{g(0) - g(1/2)}\right)}^{\text{calibration constant}} \sum_{ijk} g(x_{ij}^k)$$

where $\delta = 1/512$. The function g approaches infinity at $-\delta$ and $1+\delta$, and thus penalizes texels outside the range. As shown, the regularizing term consists of three parts: a summation over all texels in x of the function g, a calibration constant giving the regularizing term roughly equal magnitude with f(x), and a user-defined constant, $E_b$, that is used to selectively adjust the importance of constraint satisfaction. One may compute $\nabla f_{reg-01}$ analytically for the conjugate gradient method.

Figure 7:
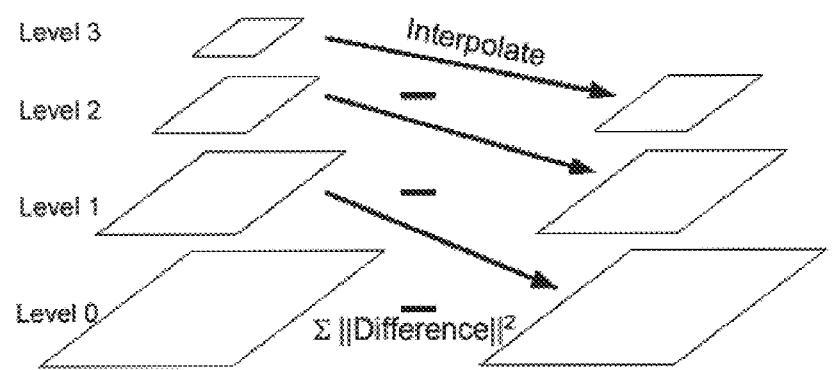
FIG. 7 is an illustrative representation of a pyramidal regularization process in accordance with certain implementations of the arrangement in FIG. 2 and the method in FIG. 3.

One of the consequences of setting up the texture inference problem in the form of Equation (1) is that only texels actually used by the graphics hardware are solved, leaving the remaining texels undefined. To support graceful degradation away from the original parameter samples and to further improve spatial coherence, it is preferred that all texels be defined. This can be achieved by adding a second term, called the pyramidal regularization, of the form:

$$f_{reg-pyramid}(x) = f_{reg-01}(x) + E_f \left(\frac{n_s}{n_t}\right) \Gamma(x) \quad (6)$$

where $\Gamma(x)$ takes the difference between the texels at each level of the MIPMAP with an interpolated version of the next coarser level as illustrated in FIG. 7. The factor $n_s/n_t$ gives the regularization term magnitude roughly equal with f. Here, the objective function f sums errors in screen space, while the two regularization terms sum errors in texture space. As such this requires a scale of the regularization terms by $n_s/n_t$.

Again, one may compute $f_{reg-pyramid}$ analytically. This regularizing term essentially imposes a filter constraint between levels of the MIPMAP, with user-defined strength $E_f$. Certain exemplary implementations also use a simple bilinear filter to allow fast construction of the MIPMAP during texture decoding. Note that while the solution step occurs during pre-preprocessing, it should account for whatever filter is actually used during the run-time processing to produce the best match. It has been found that the first regularizing term is not always needed when this MIPMAP constraint is implemented.

As depicted in FIG. 7, pyramidal regularization is computed by taking the sum of squared differences between texels at each level of the MIPMAP with the interpolated image of the next higher level.

Experimental Results with Least-Squares Method

Figure 8:
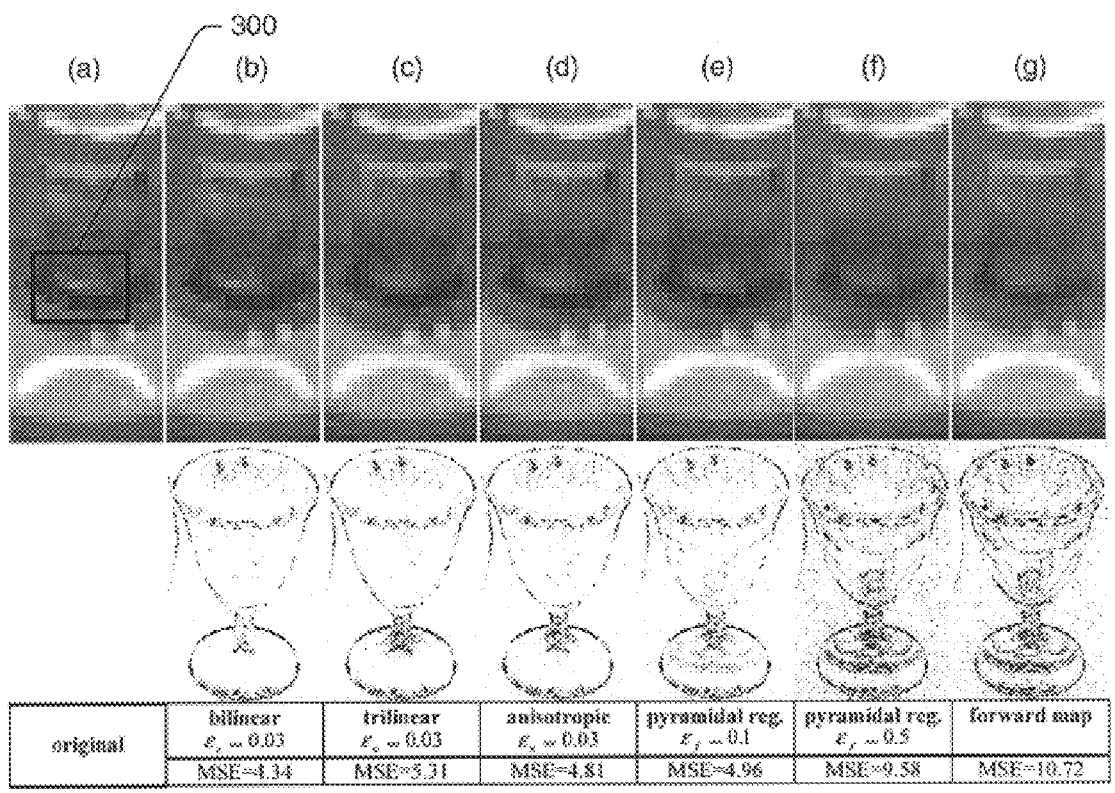
FIGS. 8, 9 and 10 depict exemplary experimental results/images associated with certain aspects of the arrangement in FIG. 2 and the method in FIG. 3.
Figure 9:
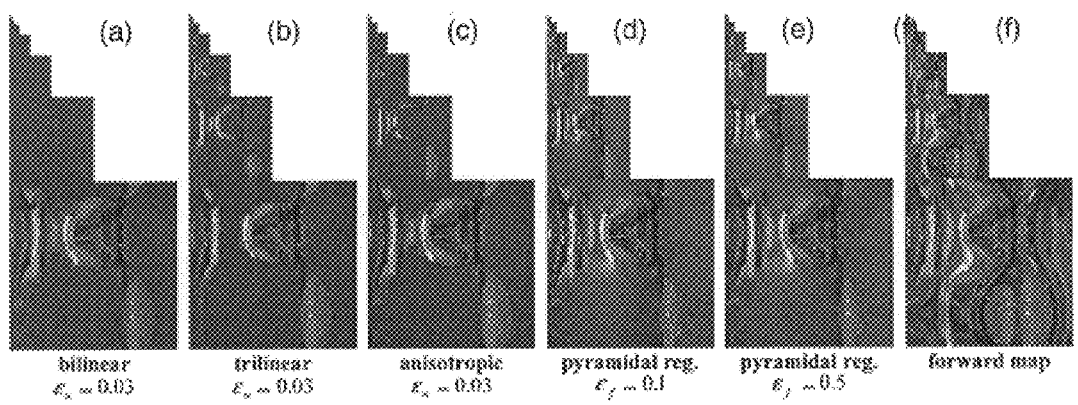

FIGS. 8(a–g) shows close-ups of various projected textures associated with parfait glass 244, as compared to the original rendering on the far left. The highlight within box 300 provides a good place to observe differences between samples (a–g). The next second row shows the inverted error signal, scaled by a factor of 20, over parfait glass 244. The bottom row contains the mean-squared error (MSE), or sum of squared pixel differences from the original image. Similarly, FIGS. 8(a–g) depicts the corresponding texture maps. In FIGS. 8(a–c), the solid gray regions represent undefined regions of the texture.

The results in FIGS. 7 and 8 show our least squares texture inference on glass parfait 244. FIG. 7(a) is the image to be matched, labeled "original". The next three images in FIGS. 7(b–d) are hardware-rendered from inferred textures using three filtering modes (i.e., bilinear, trilinear, and anisotropic) on a commercially available Nvidia Geforce graphics system. The corresponding texture maps are shown in the first three columns, respectively, of FIGS. 8(a–c). These three examples used only range regularization with $E_b$=0.03 and no pyramidal regularization. Most of the error in these examples is incurred on the parfait's silhouettes due to a mismatch between the hardware and ray-traced rendering. Also note that errors from texture inference can only be further degraded by lossy compression.

Bilinear filtering tends to provide the sharpest and most accurate result because it uses only the finest level MIPMAP and thus has the highest frequency domain with which to match the original. Isotropic MIPMAP filtering produces a somewhat worse result, and anisotropic filtering is in between. Note the increase in texture area filled from the finest pyramid level for anisotropic filtering compared to trilinear, especially near the parfait stem. Better anisotropic filtering would decrease the difference between bilinear and anisotropic; the Nvidia chip supports only anisotropy factors up to 2. Note though that bilinear filtering produces this highly accurate result only at the exact parameter values (e.g., viewpoint locations) and image resolutions where the texture was inferred. Even slight viewpoint changes away from those samples or decrease in image resolution during playback causes much larger errors.

The next two images (FIGS. 7(e–f) and FIGS. 8(d–e), respectively) show results of pyramidal regularization with anisotropic filtering. It can be seen that $E_f$=0.1 is almost identical to inference with no pyramidal regularization (labeled "anisotropic"), but $E_f$=0.5 causes noticeable blurring. The benefit of pyramidal regularization is that the entire texture is defined (i.e., the occlusion "holes" are all filled), allowing arbitrary movement away from the original viewpoint samples. Smooth hole filling also makes the texture easier to compress since there are no hard boundaries between defined and undefined samples. The regularization term makes MIPMAP levels tend toward filtered versions of each other; one may exploit this fact by compressing only the finest level result of inference and creating the higher levels using on-the-fly decimation before the texture is loaded.

Finally, the far right image (FIG. 7(g) and FIG. 8(f)) shows the "forward mapping" method in which texture samples are mapped forward to the object's image layer and interpolated using a high-quality filter (e.g., a separable Lanczos-windowed sinc function with 16 taps in both dimensions can be used). To handle occlusions, one may first filled undefined samples in the segmented layer using a simple boundary-reflection algorithm. Forward mapping produces a blurry and inaccurate result because it does not account for how graphics hardware filters the textures (in this case, anisotropic hardware filtering was used). In addition, the reflections used to provide a good interpolation near occlusion boundaries fill up undefined texture regions with artificial, high frequency information that is expensive to encode.

Optimizing Texture Coordinates and Resolutions

Since parts of an object may be occluded or off-screen, only part of its texture domain is useful. One may therefore choose texture coordinates that minimize the texture area actually needed to render an object within a block of the parameter space (blocking is discussed in further detail below).

In performing this optimization it is desirable to ensure there is adequate sampling of the visible texture image with as few samples as possible, to allow efficient computation of texture coordinates at run-time, and to significantly minimize encoding of the optimized texture coordinates.

To accomplish this, one may choose and encode a global affine transformation on the original texture coordinates rather than re-specify texture coordinates at individual vertices. Consequently, just six values are required for each object's parameter space block and texture coordinates can be computed with a simple, hardware-supported transformation. The algorithm follows:

1.) Reposition branch cut in texture dimensions that have wrapping enabled
2.) Find least-squares most isometric affine transformation. See, e.g., Maillot, J., H. Yahia, A. Verroust, "Interactive Texture Mapping," SIGGRAPH '93, 27–34, which is incorporated herein by reference, and for all purposes.
3.) Compute maximum singular value of Jacobian of texture to screen space mapping and scale transformation along direction of maximal stretch
4.) Repeat step 3 until maximum singular value is below a given threshold. See, e.g., Lengyel, J. and J. Snyder, Rendering with Coherent Layers, Siggraph 97, August 1997, pp. 233–242.
5.) Identify bounding rectangle with minimum area
6.) Determine texture resolution One may first attempt to reposition the branch cut in any texture dimensions that are periodic (i.e., have wrapping enabled). This adjustment realigns parts of the visible texture domain that have wrapped around to become discontiguous, for example, when the periodic seam of a cylinder becomes visible. A smaller portion of texture area can then be encoded. Each of the u and v dimensions can be considered independently, and the texture coordinate extents of visible triangle edges computed after clipping with the viewing frustum. If a gap in the visible extents exists, a branch cut is performed and texture wrapping disabled for that dimension. One may then find the affine transformation R(u,v), significantly minimizing the following objective function, inspired by Maillot et al. Note that when a branch cut is not possible over a "wrapped" or periodic dimension, the affine transformation can be reduced to a scale transformation by fixing the values of b and c to zero. This ensures that the texture's periodic boundary conditions are not disturbed. Those skilled in the art will also note that the translational components of the affine transformation cancel from the objective function. The objective function can be written as:

$$R(u, v) = \begin{bmatrix} a & b \\ c & d \end{bmatrix} \begin{bmatrix} u \\ v \end{bmatrix} \quad (7)$$

$$f(x) = \sum_{edges i} W_i \left( \frac{s_i - \|R(u_{i_0}, v_{i_0}) - R(u_{i_1}, v_{i_1})\|}{\min(s_i, \|R(u_{i_0}, v_{i_0}) - R(u_{i_1}, v_{i_1})\|)} \right)^2$$

where $s_i$ represents the length on the screen of a particular triangle edge, $i_0$ and $i_1$ represent the edge vertices, and $W_i$ is a weighting term that sums screen areas of triangles on each side of the edge. This minimization chooses a mapping from texture space to the screen that is as close to an isometry as possible. As noted in Maillot et al, two triangles are isometric when their edges have the same lengths. Hence, our objective function minimizes difference in lengths between triangle edges in texture space and on the screen. Here, for example, one may normalize by the minimum edge length so as to equally penalize edges that are an equal factor longer and shorter. Conjugate gradient performs the minimization with $\nabla f(x)$ calculated analytically. Note that a rotational degree of freedom remains in this optimization, which is fixed in step 5, above.

To ensure adequate sampling of an object's texture, one may check the greatest local stretch (singular value) across all screen pixels in the block where the object is "visible", using the Jacobian of the mapping from texture to screen space. Since the Jacobian for the perspective mapping is spatially varying even within a single polygon, this computation is performed separately at each screen pixel.

If the maximum singular value exceeds a user-specified threshold (such as, e.g., 1.25), one may scale the affine transformation by the maximum singular value, divided by this threshold, in the corresponding direction of maximal stretch. This essentially adds more samples to counteract the worst-case stretching. An iteration can be conducted until the maximum singular value is reduced below the threshold, usually in a very small number of iterations.

The next step identifies the minimum-area bounding rectangle on the affinely transformed texture coordinates, by searching over a set of discrete directions. The size of the bounding rectangle also determines the optimal texture resolution, which may need to be rounded to a power of 2 for currently available hardware.

Finally, since texture resolution substantially impacts performance due to texture decompression and transfer between system and video memory, compiler 110 (see FIG. 2) is also configurable to accept user-specified resolution reduction factors that scale the optimal texture resolution on a per-object basis.

Parameterized Texture Compression

Figure 10:
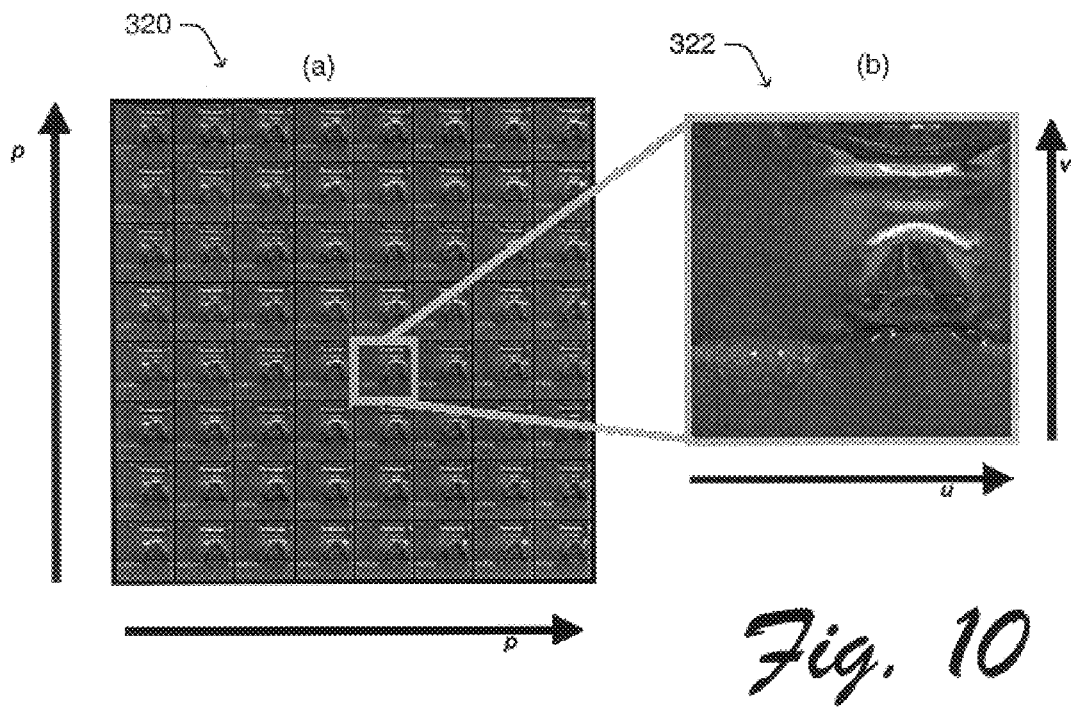

Reference is now made to the exemplary array 320 of parameterized textures 322 depicted in FIG. 10. In this example, an 8×8 block of parameterized textures 322 for parfait glass 244 is shown. Here, dimension $p_1$ represents a 1D viewpoint trajectory while $p_2$ represents the swinging or movement of a light source (not shown). Note the high degree of coherence in the texture maps.

As demonstrated with the enlarged parameterized texture 322, the texture is parameterized by the usual spatial parameters, denoted u and v. As described in greater detail below, in certain exemplary implementations, a Laplacian pyramid is used to encode the parameter space and standard 2D compression such as block-based DCT is also employed to further exploit spatial coherence within each texture (i.e., in u and v).

Thus, for example, the multidimensional field of textures for each object can be compressed by subdividing into parameter space blocks as shown in FIG. 10. Larger blocks sizes better exploit coherence but are more costly to decode during playback; 8×8 blocks were user in the experimental 2D parameter space.

Adaptive Laplacian Pyramid

Figure 11:
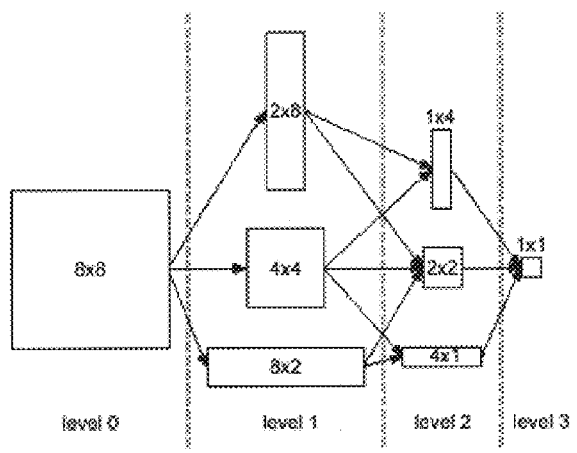
FIG. 11 is an illustrative representation of an adaptive Laplacian pyramid process in accordance with certain implementations of the arrangement in FIG. 2 and the method in FIG. 3.

FIG. 11 depicts an exemplary adaptive Laplacian pyramid that can be used to encode parameterized texture blocks using a Laplacian pyramid. For additional information on Laplacian pyramids, the reader is directed to Burt, P., and E. Adelson, "The Laplacian Pyramid as a Compact Image Code," IEEE Transactions on Communications, Vol. Com-31, No. 4, Apr. 1983, pages 532–540, which is incorporated herein by reference, and for all purposes.

Consider a single (u,v) texture sample, parameterized by a d-dimensional space $\{p_1, p_2, \ldots P_d\}$ with n samples in each dimension of the block. Starting from the finest (bottom) level with $n^d$ samples, the parameter samples are filtered using a Gaussian kernel and subsampled to produce coarser versions, until the top of the pyramid is reached containing a single sample that averages across all of parameter space. Each level of the pyramid represents the detail that should be added to the sum of the higher levels in order to reconstruct the signal. Coherent signals have relatively little information at the lower levels of the pyramid, so this structure supports efficient encoding.

Though the Laplacian pyramid is not a critically sampled representation, it requires just $\log_2(n)$ simple image additions in order to reconstruct a leaf image. In comparison, a conventional multidimensional Haar wavelet transform requires $(2d-1)\log_2(n)$ image additions and subtractions. Another advantage of the Laplacian Pyramid is that graphics hardware can perform the necessary image additions using multiple texture stages, thus enabling "on-the-fly" decompression.

Present graphics hardware based on Microsoft Corporation's DirectX™ 6.0 supports additions between unsigned fragment values and signed texels. However, no graphics hardware currently supports more than two stages in the texture pipeline. One may expect this number to increase in the future, as there is logical support for up to eight texture blending stages in the DirectX API. Our present prototype implements image operations using MMX™ instructions on the host processor.

For decoding speed, one may reconstruct using the nearest-neighbor parameter sample; higher-order interpolation temporally smoothes results but is much more expensive. The "samples" at each pyramid level are entire 2D images rather than samples at a single (u,v) location.

In certain implementations, standard 2D compression (e.g., JPEG and SPIHT encodings) to exploit spatial coherence over (u,v) space. Each level of the Laplacian pyramid thus consists of a series of encoded 2D images. Parameter and texture dimensions are treated asymmetrically because parameters are accessed along an unpredictable 1D subspace selected by the user at run-time.

Most computers cannot effectively process large fractions of the representation to decode a given parameter sample. This problem is solved, however, by using the Laplacian pyramid with fairly small block size.

In contrast, texture maps are atomically decoded and loaded into the hardware memory and so provide more opportunity for a software codec that seeks maximum compression without regard for random access. Since it is expected that the texture map decoding functionality will soon be absorbed into graphics hardware, whatever compressed representation the hardware consumes is a good choice for the "leaf node" texture maps.

It is typically assumed in image coding that both image dimensions are equally coherent. This assumption is less true of parameterized animations where, for example, the information content in a viewpoint change can greatly differ from that of a light source motion. To take advantage of differences in coherence across different dimensions, the adaptive Laplacian pyramid is used to subdivide more in dimensions with less coherence. FIG. 11 illustrates all the possible permutations of a 2D adaptive pyramid with four levels (levels 0 through 3), in which coarser levels still have 4 times fewer samples as in the standard Laplacian pyramid.

Though not shown in FIG. 11, it is also possible construct pyramids with different numbers of levels, for example to "jump" directly from an 8×8 level to an 8×1. One may pick the permutation that leads to the best compression using a greedy search.

Automatic Storage Allocation

To encode the Laplacian pyramid, storage should be assigned to its various levels. One may apply standard bit allocation techniques from signal compression. See, e.g., Gersho, A., and R. Gray, Vector Quantization and Signal Compression, Kluwer Academic, Boston, 1992, which is incorporated herein and for all purposes.

Curves of mean squared error versus storage, called rate/distortion curves, are plotted for each pyramid level and points of equal slope on each curve selected subject to a total storage constraint. More precisely, let $\overline{E_i}(r_i)$ be the mean squared error (MSE) in the encoding of level i when using $r_i$ bits. It can be shown that the minimum sum of MSE over all levels subject to a total storage constraint of R; i.e., $$\min \sum_i \overline{E_i}(r_i) \ni \sum_i r_i = R$$

occurs when the $\overline{E_1}'=\overline{E_2}'=\ldots=\overline{E_m}'$, where m is the total number of levels and $\overline{E_i}'=d\overline{E_i}/dr_i$. The sum of MSEs can be minimized because a texture image at a given point in parameter space is reconstructed as a sum of images from each level, so an error in any level contributes equally to the resulting error. A simple 1D root finder suffices to find $\overline{E_i}'$ from which the $r_i$ can be derived by inverting the rate/distortion curve at level i.

There is also a need to perform storage allocation across objects; that is, to decide how much to spend in the encoding of object A's texture vs. object B's. In certain implementations, one may use the same method as for allocating between pyramid levels, except that the error measure is $E_t=A_i\overline{E_i}$, where $A_i$ is the screen area and $E_i$ the MSE of object i. This minimizes the sum of squared errors on the screen no matter how the screen area is decomposed into objects.

Note that in certain implementations, to further speed processing, one may compute errors in texture space rather than rendering the textures and computing image errors. In many cases, it was found that doing so provided a reasonably acceptable approximation.

One complication that arises is that there can be large variations in MSE among different objects, some of which can be perceptually important foreground elements. A constraint may therefore be introduced that any object's MSE satisfy $\overline{E_i} \leq \alpha \overline{E}$ a where $\overline{E}$ is the average MSE of all objects and $\alpha>1$ is a user-specified constant.

Thus, a two-pass algorithm can be used in which one first minimizes $$\sum_i \overline{E_i}$$

over objects subject to an overall storage constraint. Using the resulting $\overline{E}$, one may then eliminate the part of the rate distortion curves of any object that incurs more MSE than $\alpha$ $\overline{E}$ and solve again. This reallocates storage from objects with low MSEs to objects with above-threshold MSEs in such a way as to minimize sum of squared error in the below-threshold objects.

The above algorithms can also be used as a starting point for manual allocation of storage across objects, so that more important objects can be more faithfully encoded. For objects with both specular and diffuse reflectance, one may encode separate lighting layers for which storage should be allocated. The method described above can be used on the entire collection of textures across objects and lighting layers.

Compensation for Gamma Correction

Splitting an object's lighting layers into the sum of two terms conflicts with gamma correction, since $\gamma(L_1+L_2) \neq \gamma(L_1)+\gamma(L_2)$ where $L_i$ are the lighting layers and $\gamma(x)=x^{1/g}$ is the (nonlinear) gamma correction function. Typically, g=2.2. Without splitting, there is no problem since one may can simply match texture maps to a gamma-corrected version of the gold standard. With splitting, one may instead infer textures from the original, uncorrected layers so that sums are correctly performed in a linear space, and gamma correct as a final step in the hardware rendering. The problem arises because gamma correction magnifies compression errors in the dark regions.

To compensate, one may instead encode based on the gamma corrected signals, $\gamma(L_i)$, thereby effectively scaling up the penalty for compression errors in the dark regions. At run-time, the inverse gamma correction function $\gamma^{-1}(x)=x^g$ can be applied to the decoded result before loading the texture into hardware memory, and, as before, sum using texture operations in a linear space and gamma correct the final result.

It is also noted that the inverse gamma function employed, as well as gamma correction at higher precision than the exemplary 8-bit frame buffer result, are useful companions to hardware decompression.

Runtime System

An exemplary runtime system essentially performs three functions: decompressing and caching texture images, applying encoded affine transformations to vertex texture coordinates, and generating calls to the graphics system for rendering.

The texture caching functionality decides which textures to keep in memory in decompressed form. Because the user's path through parameter space will likely be unpredictable, one may use an adaptive caching strategy based on the notion of lifetimes. Thus, whenever a texture image is accessed, one may reset a count of the number of frames since the image was last used. When the counter exceeds a given lifetime, the memory for the decompressed image can be reclaimed.

Preferably, different levels of the Laplacian pyramid have different levels of priority since images near the top are more likely to be reused. Lifetimes are therefore computed as being equal to $ab^l$ where a is a constant that represents the lifetime for leaf nodes (typically 20), b is the factor of lifetime increase for higher pyramid levels (typically 4) and l represents pyramid level.

Note that the number of images cached at each pyramid level and parameter space block changes dynamically in response to user behavior. If blocks of all objects are aligned, then many simultaneous cache misses occur whenever the user crosses a block boundary, creating a computational spike as multiple levels in the new blocks' Laplacian pyramids are decoded. One may mitigate this problem by staggering the blocks, using different block origins for different objects, to more evenly distribute decompression load.

Additional Experimental Results

Demo1: Light×View Compression Results:

In the first example, scene 240 (see FIG. 14) consists of 6 static objects: reflective flower vase 246, parfait glass 244, reflective table top 242, table stand 243, wall 250, and floor 248. Scene 240 contains 4384 triangles and was rendered in about 5 hours/frame on a group of 400 Mhz Pentium II PCs, producing gold standard images at 640×480 pixel resolution. The 2D parameter space has 64 viewpoint samples circling around the table at 1.8°/sample and 8 different positions of a swinging, spherical light source.

The image field was encoded using eight 8×8 parameter space blocks, each requiring storage 640×480×3×8×8= 56.25Mb/block. Our least-squares texture inference method created parameterized textures for each object, assuming trilinear texture filtering. The resulting texture fields were compressed using a variety of methods, including adaptive 2D Laplacian pyramids of both DCT- and SPIHT-encoded levels. Storage allocation over objects was computed using the method described above, with a max MSE variation constraint of α=1.25. The decoded textures were then applied in a hardware rendering on the Gullemot 3D Prophet SDR graphics card with Nvidia Geforce 256 chip, 32Mb local video memory, and 16Mb non-local AGB memory running on a Pentium II 400Mhz PC.

To test the benefits of the Laplacian pyramid, experiments were conducted that encoded each block using MPEG on a 1D zigzag path through the parameter space. A state-of-the-art MPEG4 encoder Microsoft MPEG-4 Visual Codec FDIS 1.02, ISO/IEC 14496-5 FDISI, August 1999 was used. Finally, a comparison was made withdirect compression of the original images (rather than renderings using compressed textures), again using MPEG 4 with one I-frame per block. This gives MPEG the greatest opportunity to exploit coherence with motion prediction.

Figure 15:
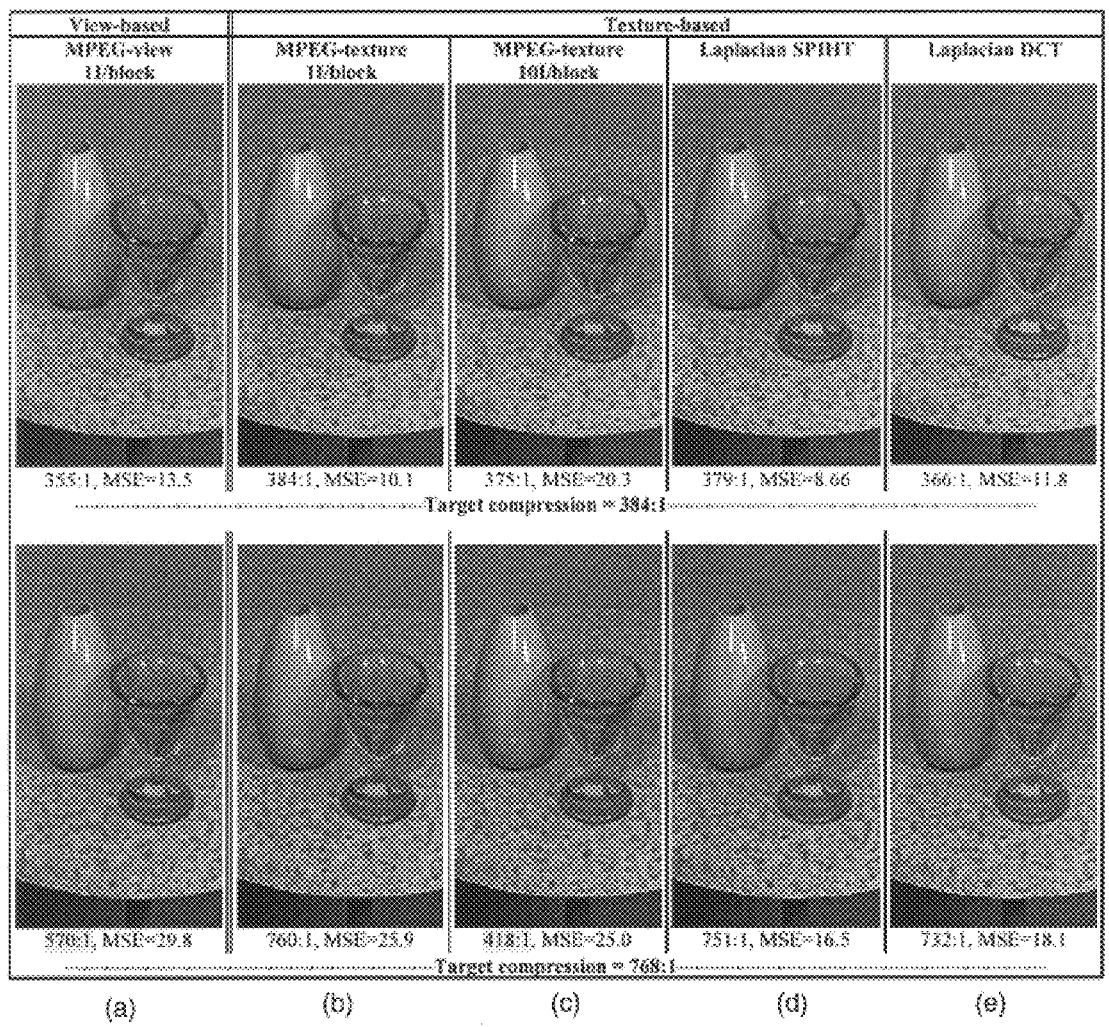

FIG. 15 shows the results at two targeted compression rates: 384:1 (middle row) and 768:1 (bottom row), representing target storage of 150k/block and 75k/block respectively. Due to encoding constraints, some compression ratios undershot the target and are highlighted in gray shading (FIGS. 15(*a,c*)).

All texture-based images were generated on graphics hardware; their MSEs were computed from the frame buffer contents. MSEs were averaged over an entire block of parameter space. Both Laplacian pyramid texture encodings (right two columns) achieve reasonable quality at 768: 1, and quite good quality at 384:1. The view-based MPEG encoding, labeled "MPEG-view" (FIG. 15(*a*)), is inferior with obvious block artifacts on object silhouettes, even though MPEG encoding constraints did not allow as much compression as the other examples. The SPIHT- encoded Laplacian pyramid (FIG. 15(*d*) is slightly better than DCT, exhibiting blurriness rather than block artifacts (observe the left hand side of the vase for the 768:1 row). The differences in the pyramid schemes between the 384:1 and 768:1 targets are fairly subtle, but can be seen most clearly in the transmitted image of the table top 242 through parfait glass 244. Additional close up details can be further seen in the examples in FIGS. 14(*b–e*). Of course, artifacts visible in a still image are typically much more obvious temporally.

For MPEG encoding of textures two schemes were tried: one using a single I-frame per block (IBBPBBP . . . BBP) labeled "MPEG-texture 1I/block", and another using 10 I-frames (IBBPBBIBBPBBI . . . IBBP) labeled "MPEG-texture 10I/block". The zigzag path was chosen so that the dimension of most coherence varies most rapidly, in this case the light position dimension. Though single I-frame/block maximizes compression, it increases decoding time. In the worst case, accessing a parameterized texture requires 23 inverse DCT operations, 22 forward predictions, 1 backward prediction and 1 interpolation prediction for the single I/block case. Note that decreasing the number of I-frames per block in MPEG is somewhat analogous to increasing the block size, and thus the number of levels, in our pyramid schemes-both trade-off decoding speed for better compression.

It is not believed that the 1I/block encoding is practical for real-time decoding, but include the result for quality comparison. For the 10I/block, 4 inverse DCT's, 2 forward predictions, 1 backward prediction, and 1 interpolative prediction are required in the worst case. This is roughly comparable to our DCT Laplacian pyramid decoding, which also requires 4 inverse DCT operations, though pyramid reconstruction involves only 3 image additions rather than more complicated motion predictions.

The 10I/block MPEG-texture results have obvious block artifacts at both quality levels especially on the vase and green wallpaper in the background. They are inferior to the pyramid encodings. This is true even though we were unable to encode the scene with higher compression than 418:1, significantly less than the other examples in the bottom row. This result is not surprising given that MPEG can only exploit coherence in one dimension. The 1I/block results are better, but still inferior to the pyramid schemes at the 384:1 target, where the vase exhibits noticeable block artifacts.

For the 768:1 target, the quality of MPEG-texture 1I/block falls between the SPIHT and DCT pyramids. Note that the MPEG-texture schemes still use many of the novel features of our approach: hardware-targeted texture inference, separation of lighting layers, and optimal storage allocation across objects.

Figure 16:
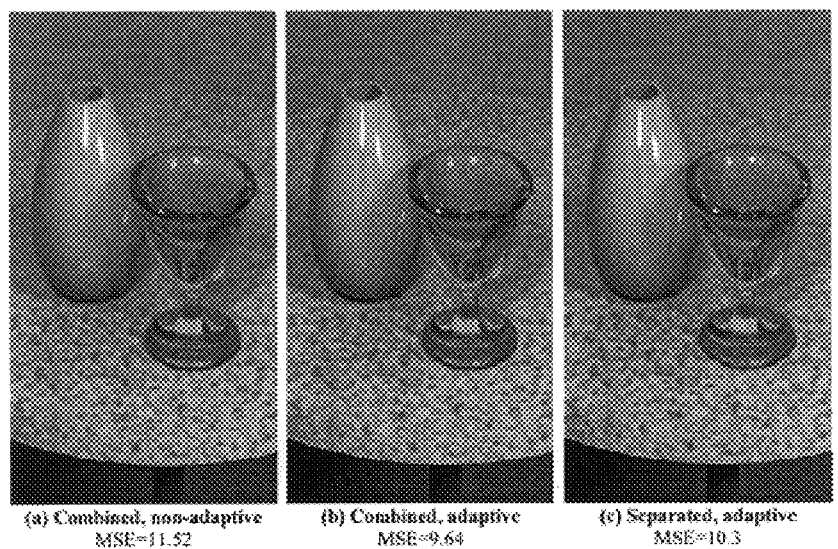

FIG. 16 isolates the benefits of lighting separation and adaptive Laplacian subdivision. These results were achieved with the Laplacian SPIHT encoding at the 384:1 target. With combined lighting layers, adaptive subdivision increases fidelity especially noticeable in the table 242 seen through parfait glass 244 (FIGS. 16(a,b); MSE across the block is reduced by about 20%. This is because textures, especially that of parfait glass 244, changes much less over the light position dimension than over the view dimension. In response, the first level of pyramid subdivision occurs entirely over the view dimension. We then separately encode the diffuse and specular lighting layers, still using adaptive subdivision (see FIG. 16(c)). While this increases MSE slightly because additional texture layers should be encoded, the result is perceptually better, producing sharper highlights on the vase.

Note that only the table-top 242 and flower vase 246 objects had separately encoded diffuse and specular layers; they were the only objects with diffuse and reflective terms in their shading model. Thus a total of 8 parameterized textures were encoded for this scene.

System Performance

The average compilation and preprocessing time per point in parameter space is depicted in table 400 of FIG. 12. It can be seen that total compilation time is a small fraction of the time to produce the ray-traced images.

To determine playback performance, we measured average and worst-case frame rates (frames per second or fps) for a diagonal trajectory that visits a separate parameter sample at every frame. The results for both DCT-and SPIHT-Laplacian pyramid encodings are summarized in table 500 of FIG. 13 for compression at the 384:1 target.

The performance bottleneck currently appears to be software decoding speed. When all necessary textures are cached in decompressed form, our system achieves an average frame rate of 34 frames/second. To improve performance, we tried encoding textures at reduced resolution. Reducing texture resolution by an average factor of 11 (91%) using a manually specified reduction factor per object provides acceptable quality at about 9fps with DCT. Decoding speedup is not commensurate with resolution reduction because it partially depends on signal coherence and decimated signals are less coherent.

Demo2: View×Object Rotation:

In a second example, we added a dynamically rotating, reflective gewgaw 252 on the table 242. The parameter space consists of a 1D circular viewpoint path, containing 24 samples at 1.5°/sample, and the rotation angle of the gewgaw, containing 48 samples at 7.5°/sample.

Figure 17:
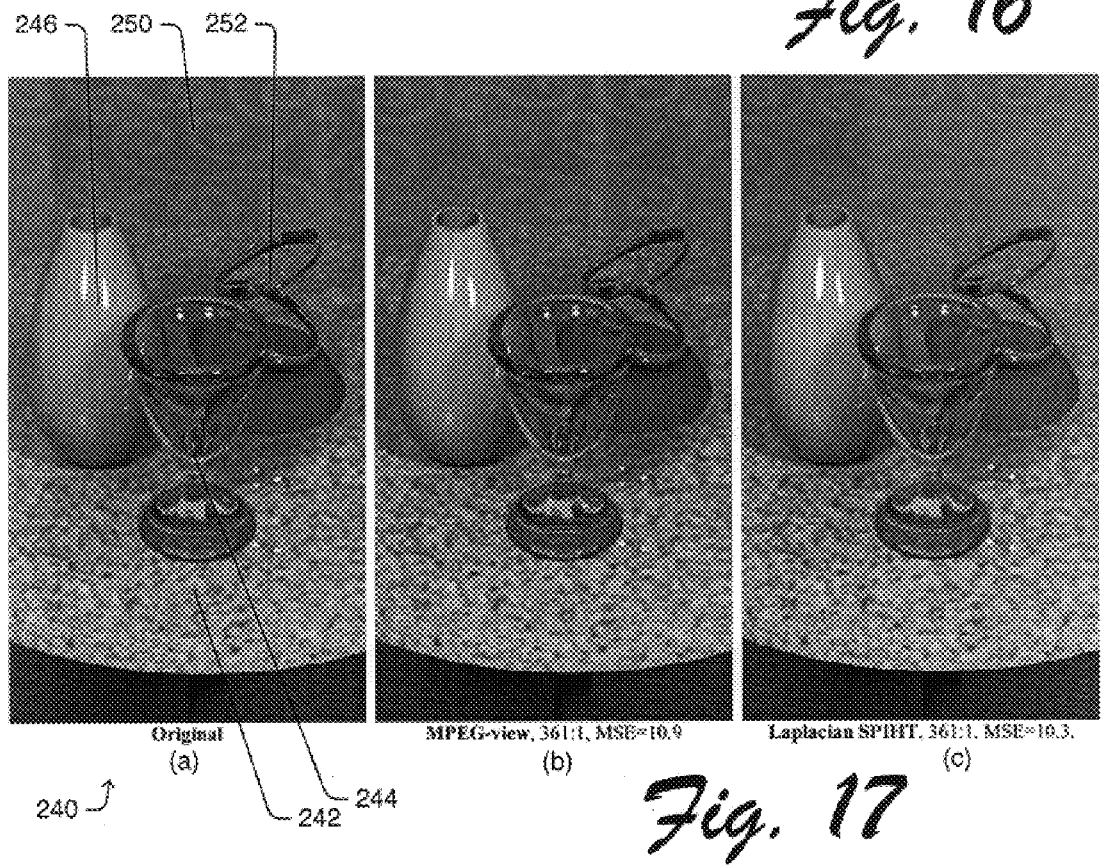

Results are shown in FIG. 17 for encodings using MPEG-view and Laplacian SPIHT. This was a challenging example for our method. There are many specular objects in the scene, reducing the effectiveness of lighting separation (gewgaw 252 and parfait glass 244 have no diffuse layer). The parameter space is much more coherent in the rotation dimension than in the view dimension, because gewgaw rotation only changes the relatively small reflected or refracted image of the gewgaw in the other objects.

On the other hand, gewgaw 252 itself is more coherent in the view dimension because it rotates faster than the view changes. MPEG can exploit this coherence very effectively using motion compensation along the rotation dimension.

Though our method is designed to exploit multidimensional coherence and lacks motion compensation, our adaptive pyramid also responds to the unbalanced coherence, producing a slightly better MSE and a perceptually better image.

To produce these results, we selectively adjusted the storage allocation over objects. Shading on the background objects (walls, floor, and table stand) is static since they are diffuse and gewgaw 252 casts no shadows on them. Their storage can thus be amortized over all 18 blocks of the parameter space. Because they project to a significant fraction of the image and can be so efficiently compressed, our automatic method gives them more storage than their perceptual importance warrants. We reduced their allocation by 72% and devoted the remainder to an automatic allocation over the foreground objects.

Even with this reduction, the texture-based encoding produces less error on the background objects, as can be seen in FIG. 17(c). The real-time performance for this demo was approximately the same as for demo1.

Conclusion

Given the above detailed descriptions, those skilled in the art will recognize that synthetic imagery can be very generally parameterized using combinations of view, light, or object positions, among other parameters, to create a multidimensional animation. While real-time graphics hardware fails to capture all the shading effects of a ray tracer running offline, it does provide a useful operation for quickly decoding such an animation compiled beforehand: texture-mapped polygon rendering. We were able to encode a parameterized animation using parameterized texture maps, exploiting the great coherence in these animations better than view-based representations.

The various exemplary methods and arrangements described above illustrate how to infer parameterized texture maps from segmented imagery to obtain a significantly close match to the original and how to compress these maps efficiently, both in terms of storage and decoding time.

Out experimental results have shown show that data compression ratios of up to about 800:1 can be achieved with good quality and real-time decoding. Unlike previous work in multidimensional IBR, we have also shown that our methods and arrangement are superior to a state of the art image sequence coder applied to a sensible collapse of the space into 1D. Our simple sum of diffuse and specular texture maps is but a first step toward more predictive graphics models supported by hardware to aid compression. Examples include parameterized environment maps to encode reflections, hardware shadowing algorithms, and per-vertex shading models. We have also been able to take advantage of texture blending operations such as multiplication. This can be useful in separating a high-frequency but parameter-independent albedo map from a low-frequency, parameter-dependent incident irradiance field.

Extending this work to deforming geometry should be possible using parameter-dependent geometry compression. Another extension is to match photorealistic camera models (e.g., imagery with depth of field effects) in addition to photorealistic shading. This should be possible using conventional accumulation-buffer methods or with hardware post-processing on separately rendered sprites. The use of perceptual metrics to guide compression and storage allocation is another important extension. Additionally, the methods and arrangements can be adapted to automatically generate contiguous, sampling-efficient texture parameterizations over arbitrary meshes using a minimum of maps. We also expect the ability to load compressed textures directly to hardware in the near future. Thus, a further enhancement would be to load compressed parameter-dependent texture block pyramids.

In the exemplary methods and arrangements as described herein, the particular choice of image compressor is not as important to the invention as is the idea of compressing in the texture domain. Consequently, the methods and arrangements are not limited to the exemplary Laplacian pyramid approach. In certain implementations, one would prefer those compression techniques that are specifically supported by the targeted graphics hardware.

As described herein, one can overlay a per-view image on the final result to encode the small residual errors that remain after the texture coding and graphics hardware rendering. In other words, a compressed residual image can be added in the view space rather than just in the texture space.

Moreover, one can make use of more sophisticated graphics models. For example, an environment map can be solved for by encoding reflections rather than solving for a surface texture and encoding the corresponding reflection.

While compression of the geometric signal has only been briefly addressed here, those skilled in the art will recognize certain additional benefits stemming there from. By way of example, for scenes with large amounts of changing geometry, approaches such as that described in Lengyel, "Compression of Time-Dependent Geometry", ACM Symposium on Interactive 3D Graphics 1999, can be adapted.

Furthermore, the various techniques presented above are not meant to be limited only to computer-generated scenes. An actual, physical scene can be sampled from a parametric set of viewpoints, lighting, or object motions. For example, a camera can be moved along a series of viewpoints while, independently, a set of objects move in a parameterized fashion. Then, after the scene's geometry is obtained, either by vision techniques or by other modeling approaches (measurement by hand, for example), the same approaches as described above can be applied to solve for and compress the multi-dimensional textures that would give the proper result when played back on a fast texture-mapping graphics engine.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method comprising:
   generating image data associated with each point in a modeled parameter space of a computer-generated animation; and
   selectively inferring texture data for each defined object within the parameter space.

2. The method as recited in claim 1, wherein the texture data includes data selected from a group comprising texture resolution data, texture domain mapping data, and texture sample data.

3. The method as recited in claim 1, wherein the parameter space is n-dimensional, wherein n is an integer greater than or equal to two.

4. The method as recited in claim 1, wherein the image data includes at least one type of image data selected from a group comprising synthetic renderer image data, synthetic renderer, and ray-traced image data.

5. The method as recited in claim 4, wherein the image data includes sampled data having image information from a camera and a geometry based on at least one of the following vision algorithms and range scanners.

6. The method as recited in claim 4, wherein the ray-traced image data is selectively segmented based on each defined object within the parameter space.

7. The method as recited in claim 1, further comprising:
   generating scene geometry data associated with the parameter space; and
   wherein selectively inferring texture data for each defined object within the parameter space further includes producing a plurality of per-object texture maps using at least the scene geometry data and the image data.

8. The method as recited in claim 1, further comprising:
   generating scene lighting data associated with the parameter space; and
   wherein selectively inferring texture data for each defined object within the parameter space further includes producing a plurality of per-object texture maps using at least the scene lighting data and the image data.

9. The method as recited in claim 1, further comprising:
   generating scene viewing data associated with the parameter space; and
   wherein selectively inferring texture data for each defined object within the parameter space further includes producing a plurality of per-object texture maps using at least the scene viewing data and the image data.

10. The method as recited in claim 1, further comprising:
    generating scene geometry data, scene lighting data and scene viewing data associated with the parameter space; and
    wherein selectively inferring texture data for each defined object within the parameter space further includes producing a plurality of per-object texture maps using the scene geometry data, the scene lighting data, the scene viewing data, and the image data.

11. The method as recited in claim 1, wherein selectively inferring texture data for each defined object within the parameter space further includes producing a plurality of parameter-dependent texture maps for each of the defined objects.

12. The method as recited in claim 11, wherein the parameter-dependent texture maps include texture information based on at least two parameters.

13. The method as recited in claim 12, wherein the texture information based on the at least two parameters includes radiance information.

14. The method as recited in claim 12, wherein at least one of the two parameters is associated with a parameter selected from a group comprising a time parameter, a light source position parameter, a viewpoint parameter, a surface reflectance parameter, and an object position parameter.

15. The method as recited in claim 12, wherein at least one of the two parameters is associated with a modeled parameter that is configured to provide an arbitrary-dimensional parameterized animation over a sequence of generated images.

16. The method as recited in claim 11, further comprising:
    compressing at least a portion of the plurality of parameter-dependent texture maps.

17. The method as recited in claim 16, wherein compressing at least a portion of the plurality of parameter-dependent texture maps further includes:
    selectively encoding the portion of the plurality of parameter-dependent texture maps as a multidimensional Laplacian pyramid based on blocks of the parameter space.

18. The method as recited in claim 17, wherein selectively encoding the portion of the plurality of parameter-dependent texture maps as a multidimensional Laplacian pyramid further includes adaptively splitting the parameter space.

19. The method as recited in claim 18, wherein the parameter space is adaptively split based on differences in coherence across different parameter dimensions.

20. The method as recited in claim 19, wherein the parameter space is adaptively split based on separate diffuse and specular lighting layers.

21. The method as recited in claim 11, further comprising:
transporting at least a portion of the plurality of parameter-dependent texture maps.

22. The method as recited in claim 11, further comprising:
selectively rendering a two-dimensional image of at least a portion of the parameter space using the plurality of parameter-dependent texture maps.

23. The method as recited in claim 22, wherein selectively rendering a two-dimensional image of at least a portion of the parameter space using the plurality of parameter-dependent texture maps further includes rendering one frame at a time at one point of the parameter space, such that a sequence of images can be generated for user navigation through the parameter space.

24. A computer-readable medium having computer-executable instructions for causing at least one processing unit to perform steps comprising:
generating image data associated with each point in a modeled parameter space of a computer-generated animation; and
selectively inferring texture data for each defined object within the parameter space.

25. The computer-readable medium as recited in claim 24, wherein the texture data includes data selected from a group comprising texture resolution data, texture domain mapping data, and texture sample data.

26. The computer-readable medium as recited in claim 24, further comprising computer-executable instructions for causing the at least one processing unit to perform steps comprising:
generating scene geometry data associated with the parameter space; and
wherein selectively inferring texture data for each defined object within the parameter space further includes producing a plurality of per-object texture maps using at least the scene geometry data and the image data.

27. The computer-readable medium as recited in claim 24, further comprising computer-executable instructions for causing the at least one processing unit to perform steps comprising:
generating scene lighting data associated with the parameter space; and
wherein selectively inferring texture data for each defined object within the parameter space further includes producing a plurality of per-object texture maps using at least the scene lighting data and the image data.

28. The computer-readable medium as recited in claim 24, further comprising computer-executable instructions for causing the at least one processing unit to perform steps comprising:
generating scene viewing data associated with the parameter space; and
wherein selectively inferring texture data for each defined object within the parameter space further includes producing a plurality of per-object texture maps using at least the scene viewing data and the image data.

29. The computer-readable medium as recited in claim 24, further comprising computer-executable instructions for causing the at least one processing unit to perform steps comprising:
generating scene geometry data, scene lighting data and scene viewing data associated with the parameter space; and
wherein selectively inferring texture data for each defined object within the parameter space further includes producing a plurality of per-object texture maps using the scene geometry data, the scene lighting data, the scene viewing data, and the image data.

30. The computer-readable medium as recited in claim 24, wherein selectively inferring texture data for each defined object within the parameter space further includes producing a plurality of parameter-dependent texture maps for each of the defined objects.

31. The computer-readable medium as recited in claim 30, further comprising computer-executable instructions for causing the at least one processing unit to perform steps comprising:
compressing at least a portion of the plurality of parameter-dependent texture maps.

32. The computer-readable medium as recited in claim 31, wherein compressing at least a portion of the plurality of parameter-dependent texture maps further includes:
selectively encoding the portion of the plurality of parameter-dependent texture maps as a multidimensional Laplacian pyramid based on blocks of the parameter space.

33. The computer-readable medium as recited in claim 30, further comprising computer-executable instructions for causing the at least one processing unit to perform steps comprising:
transporting at least a portion of the plurality of parameter-dependent texture maps.

34. The computer-readable medium as recited in claim 30, further comprising computer-executable instructions for causing the at least one processing unit to perform steps comprising:
selectively rendering a two-dimensional image of at least a portion of the parameter space using the plurality of parameter-dependent texture maps.

35. An apparatus comprising:
a first renderer configured to generate image data associated with each point in a modeled parameter space of a computer-generated animation; and
a compiler operatively coupled to the first renderer and configured to selectively infer texture data for each defined object within the parameter space.

36. The apparatus as recited in claim 35, wherein the texture data includes data selected from a group comprising texture resolution data, texture domain mapping data, and texture sample data.

37. The apparatus as recited in claim 35, wherein the parameter space is n-dimensional, wherein n is an integer greater than or equal to two.

38. The apparatus as recited in claim 35, wherein the first renderer generates synthetic renderer image data.

39. The apparatus as recited in claim 38, wherein the synthetic renderer image data includes ray-traced image data.

40. The apparatus as recited in claim 38, wherein compiler selectively segments the ray-traced image data based on each defined object within the parameter space.

41. The apparatus as recited in claim 35, wherein:
the first renderer is further configured to generate scene geometry data associated with the parameter space; and
the compiler is further configured to produce a plurality of per-object texture maps using at least the scene geometry data and the image data.

42. The apparatus as recited in claim 35, wherein:
the first renderer is further configured to generate scene lighting data associated with the parameter space; and
the compiler is further configured to produce a plurality of per-object texture maps using at least the scene lighting data and the image data.

43. The apparatus as recited in claim 35, wherein:
the first renderer is further configured to generate scene viewing data associated with the parameter space; and
the compiler is further configured to produce a plurality of per-object texture maps using at least the scene viewing data and the image data.

44. The apparatus as recited in claim 35, wherein:
the first renderer is further configured to generate scene geometry data, scene lighting data and scene viewing data associated with the parameter space; and
the compiler is further configured to produce a plurality of per-object texture maps using the scene geometry data, the scene lighting data, the scene viewing data, and the image data.

45. The apparatus as recited in claim 35, wherein the compiler is further configured to produce a plurality of parameter-dependent texture maps for each of the defined objects.

46. The apparatus as recited in claim 45, further comprising:
an encoder operatively coupled to the compiler and configured to compress at least a portion of the plurality of parameter-dependent texture maps.

47. The apparatus as recited in claim 46, wherein the encoder is further configured to selectively encode the portion of the plurality of parameter-dependent texture maps as a multidimensional Laplacian pyramid based on blocks of the parameter space.

48. The apparatus as recited in claim 45, further comprising:
a communication media operatively coupled to the encoder and configured to transport at least a portion of the plurality of parameter-dependent texture maps.

49. The apparatus as recited in claim 48, further comprising:
a second renderer operatively coupled to the communication media and configured to selectively render a two-dimensional image of at least a portion of the parameter space using the plurality of transported parameter-dependent texture maps.

50. The apparatus as recited in claim 49, wherein the second renderer selectively renders one frame at a time at one point of the parameter space, such that a sequence of images can be generated for user navigation through the parameter space.

51. The apparatus as recited in claim 49, wherein the second renderer is further configured to decode and decompress the plurality of transported parameter-dependent texture maps, when applicable.

52. A method for rendering an arbitrary-dimensional parameterized animation, the method comprising:
for at least one object within a scene, parameterizing a radiance field based on at least one parameter selected from a group comprising time, lighting, viewpoint, reflectance, object positions, and degrees of freedom in a scene, resulting in an arbitrary-dimensional parameterized animation; and
encoding image data associated with the parameterized animation.

53. The method as recited in claim 52, further comprising transporting the encoded image data.

54. The method as recited in claim 53, further comprising:
selectively decoding at least a portion of the transported encoded image data; and
rendering a visually explorable image based on the decoded image data.

55. The method as recited in claim 54, wherein parameterizing the radiance field further includes selectively inferring parameter-dependent texture maps for individual objects.

56. A method for encoding ray-traced images for each point in a parameter space associated with an n-dimensional frame sequence as generated by a high quality renderer, the method comprising:
providing image data to a compiler along with related scene geometry information, lighting model information, and viewing parameter information; and
using a compression engine that is configured to implement a multi-dimensional compression scheme to encode the complied image data.

57. The method as recited in claim 56, wherein the compiler is operatively configured for use with a specific runtime decoder.

58. The method as recited in claim 57, wherein the compiler is configured to infer texture resolution information, texture domain mapping information, and texture sample information for each object within a parameter space represented by the image data.

59. The method as recited in claim 58, further comprising:
providing at least a portion of the encoded image data to a decoder;
with the decoder, decoding the portion of the encoded image data using a texture decompression engine, and rendering decoded image data using a rendering engine.

60. A method for inferring, for each geometric object, a parameterized texture based on ray-traced images, the method comprising:
segmenting ray-traced images into per-object portions by generating a per-object mask image as well as a combined image, each at supersampled resolutions;
for each object, filtering a relevant portion of the combined image as indicated by the object's respective mask and dividing by a fractional coverage computed by applying a filter to the object's mask.

61. The method as recited in claim 60, wherein the filter includes a gaussian filter.

62. A method for use with a computer, the method comprising the steps of:
developing a matrix A that is an $n_s \times n_t$ matrix, where $n_s$ is an integer equal to a number of screen pixels in which an object is visible with in a graphically depicted scene, and $n_t$ is an integer that is equal to a number of texels in a corresponding texture MIPMAP pyramid for the object; and
solving for a texture represented by a vector x by minimizing a function f(x) defined as $$f(x) = \|Ax-b\|^2 \nabla f(x) = 2A^T(Ax-b)$$

wherein $0 \leq x_{i,j}^k \leq 1$.

63. The method as recited in claim 62, further comprising selectively scaling up the solving step until a desired texture resolution is reached as part of a multiple resolution solution and wherein the multiple resolution solution is extendable to an n-dimensional parameter space, wherein n is an integer greater than or equal to two.

64. The method as recited in claim 63, wherein the multiple resolution solution further includes selectively segmenting ray-traced images into view-dependent and view-independent layers so as to compute a single diffuse texture as follows:

$$\overbrace{\begin{bmatrix} A_{v_0} \\ A_{v_1} \\ \vdots \\ A_{v_{n-1}} \end{bmatrix}}^{A'} \begin{bmatrix} x \end{bmatrix} = \overbrace{\begin{bmatrix} b_{v_0} \\ b_{v_1} \\ \vdots \\ b_{v_{n-1}} \end{bmatrix}}^{b'}$$

wherein matrix A' concatenates A matrices for individual viewpoints $v_0$ through $v_{n-1}$, vector b' concatenates ray-traced images at corresponding viewpoints, and vector x represents a diffuse texture to be solved.

65. The method as recited in claim 63, further comprising:
providing a pyramidal regularization term that support a controlled degradation away from original parameter samples and to further improve spatial coherence.

66. The method as recited in claim 65, wherein the pyramidal regularization term has the form of:

$$f_{reg-pyramid}(x) = f_{reg-01}(x) + E_f\left(\frac{n_s}{n_l}\right)\Gamma(x)$$

where $\Gamma(x)$ includes a difference between the texels at each level of the MIPMAP with an interpolated version of a next coarser level, factor $n_s/n_l$, provides a magnitude roughly equal with f, and $E_f$ is a definable constant.

67. The method as recited in claim 66, wherein the pyramidal regularization term is computed by taking the sum of squared differences between texels at each level of the MIPMAP with the interpolated image of the next higher level.

68. The method as recited in claim 62, further comprising selectively optimizing texture coordinates and resolutions.

69. The method as recited in claim 68, wherein optimizing texture coordinates and resolutions further includes:
identifying texture coordinates that minimize the texture area actually needed to render an object within a block of the parameter space; and
encoding a global affine transformation on any associated texture coordinates.

70. The method as recited in claim 69, wherein the encoding further includes:
(1) repositioning branch cut in texture dimensions that have wrapping enabled;
(2) calculating a least-squares solution for the most isometric affine transformation;
(3) computing a maximum singular value of a Jacobian of texture to screen space mapping and scale transformation along a direction of maximal stretch
(4) repeating step (3) until the maximum singular value is below a defined threshold;
(6) identifying a bounding rectangle with minimum area; and
(7) determining a texture resolution.

71. A parameterized texture compression method comprising:
generating at least one block of parameterized texture for at least one object within a multidimensional parameter space, wherein the texture is parameterized by a plurality of spatial parameters; and
encoding the parameter space using a block-based compression scheme configured to exploit spatial coherence within each of the parameterized textures.

72. The method as recited in claim 71, wherein the block-based compression scheme further includes an adaptive Laplacian pyramid configured to encode the parameterized texture blocks using a Laplacian pyramid, wherein each level of the pyramid represents detail that should be added to the sum of higher levels in order to reconstruct an image of the object during subsequent rendering.

73. The method as recited in claim 72, wherein each of the levels of the Laplacian pyramid include a series of encoded two-dimensional images.

74. The method as recited in claim 73, further comprising:
providing automatic storage allocation, whereby during the encoding of the Laplacian pyramid, storage of information is assigned to the various levels of the pyramid so as to minimize the sum of mean squared errors (MSEs) since a texture image at a given point in parameter space can be reconstructed as a sum of images from each level.

75. The method as recited in claim 74, further comprising:
for objects with both specular and diffuse reflectance information, encoding separate lighting layers for which storage is allocated.

76. A method of compensation for gamma correction in image-based rendering, the method comprising:
selectively splitting an object's lighting layers into a sum of two terms $L_1$ and $L_2$ such that the two terms conflict with a gamma correction, since $\gamma(L_1+L_2) \neq \gamma(L_1)+\gamma(L_2)$ wherein $\gamma(x)=x^{1/g}$ is a nonlinear gamma correction function; and
selectively encoding corresponding object image data based on a gamma corrected signals, $\gamma(L_i)$, by controlling compression errors associated with dark regions in the object's image.

77. The method as recited in claim 76, further comprising:
selectively decoding the encoding corresponding image data using an inverse gamma correction function $\gamma^{-1}(x)=x^g$.

78. An apparatus configured to cache encoded texture images selectively decode the cached texture images and apply encoded affine transformations to vertex texture coordinates.

79. The apparatus as recited in claim 78, further configurable to generate at least one call to a graphics system capable of rendering an image based on decoded image information.

80. The apparatus as recited in claim 78, further configured to selectively store decoded image information based on an adaptive caching strategy.

81. The apparatus as recited in claim 80, wherein the adaptive caching strategy is based at least in part on a lifetime associated with the texture image information.

82. The apparatus as recited in claim 80, wherein the adaptive caching strategy is based on texture image information having different levels of priority.

83. The apparatus as recited in claim 78, wherein the cached texture images have an associated Laplacian pyramidal encoding scheme.

84. The apparatus as recited in claim 83, wherein the Laplacian pyramidal encoding scheme includes a plurality of blocks that are selectively staggered.

85. The apparatus as recited in claim 84, wherein the plurality of blocks that are selectively staggered by having different block origins for different objects within a parameter space.

* * * * *